United States Patent
Kato et al.

(10) Patent No.: US 6,972,158 B2
(45) Date of Patent: *Dec. 6, 2005

(54) MAGNETIC RECORDING MEDIUM

(75) Inventors: Atsushi Kato, Miyagi (JP); Naoyuki Numata, Miyagi (JP); Junji Kagawa, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/118,251

(22) Filed: Apr. 29, 2005

(65) Prior Publication Data

US 2005/0196640 A1 Sep. 8, 2005

Related U.S. Application Data

(63) Continuation of application No. 10/442,720, filed on May 21, 2003, now Pat. No. 6,929,850.

(30) Foreign Application Priority Data

Jun. 14, 2002 (JP) .............................. 2002-173544
Jan. 14, 2003 (JP) .............................. 2003-005227

(51) Int. Cl.$^7$ .............................................. G11B 5/716
(52) U.S. Cl. ................................. 428/839.3; 428/839.6
(58) Field of Search ........................ 428/839.3, 839.6

(56) References Cited

U.S. PATENT DOCUMENTS 5,098,773 A * 3/1992 Saito et al. .................. 428/212
5,582,910 A * 12/1996 Araki et al. ................. 428/323

* cited by examiner

Primary Examiner—Stevan A. Resan
(74) Attorney, Agent, or Firm—Robert J. Depke; Trexler, Bushnell, Giangiorgi, Blackstone & Marr

(57) ABSTRACT

The present invention provides a magnetic recording medium which can record both digital and analog signals by, e.g., VTR for commercial use and improve their electromagnetic conversion characteristics. A magnetic recording medium comprises a nonmagnetic support, and first and second magnetic layers comprised respectively of magnetic powder (A) and (B), wherein the first and second magnetic layers are formed on the nonmagnetic support in this order, wherein the magnetic powder (A) and (B) have the following characteristics:

saturation magnetization σs(A): 80 to 150 Am$^2$/kg;
coercive force Hc(A): 90 to 180 kA/m,
saturation magnetization σs(B): 100 to 200 Am$^2$/kg,
coercive force Hc(B): 100 to 200 kA/m,
wherein the first and second magnetic layers satisfy the below relationships and have thickness T(A) and T(B) in the below ranges:

σs(A)/σs(B)≦1.0, Hc(A)/Hc(B)≦1.0, 1.0 μm≦T(A)≦4.0 μm, 0.01 μm≦T(B)≦0.5 μm.

1 Claim, 28 Drawing Sheets

RELATIONSHIP BETWEEN $\sigma s$

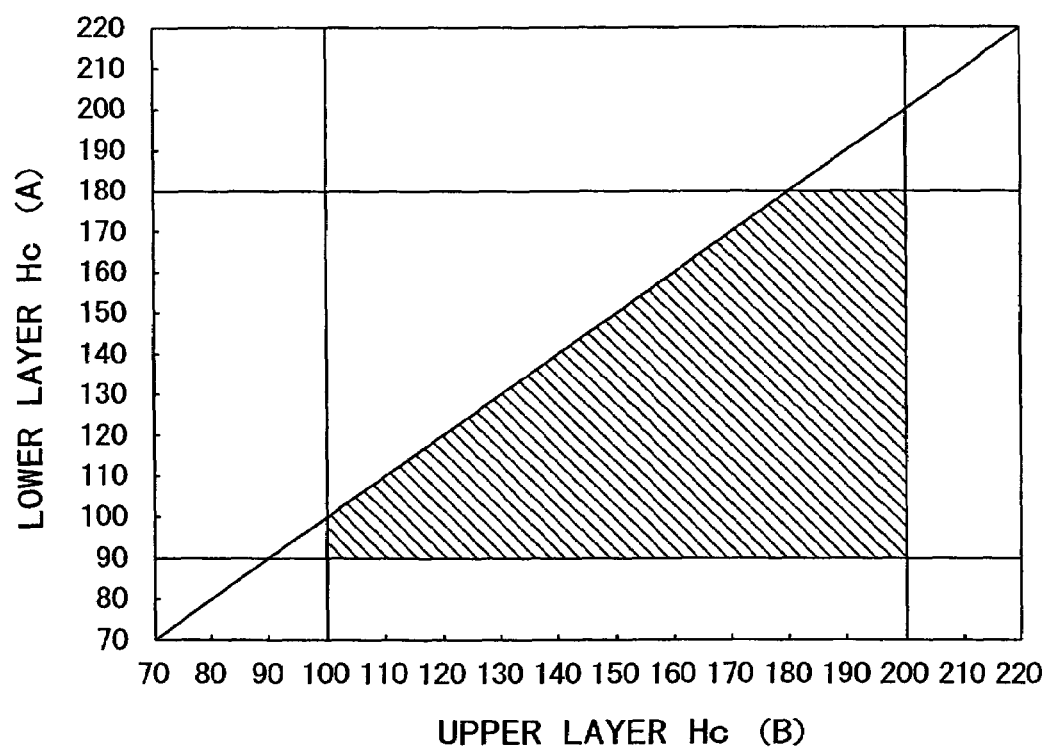
F I G. 3

F I G. 1 2
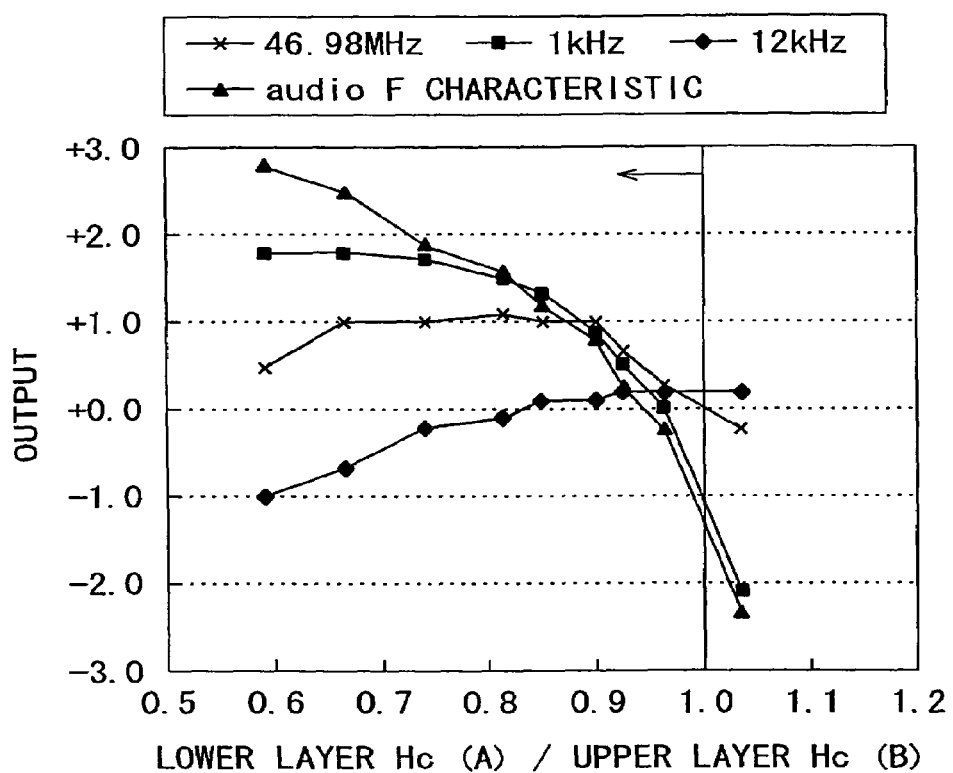

FIG. 15

|  | UPPER LAYER MAGNETIC POWDER | | | | LOWER LAYER MAGNETIC POWDER | | | |
|---|---|---|---|---|---|---|---|---|
|  | σs (Am²/kg) | Hc (kA/m) | Co CONTENT (%) | THICK- NESS (μm) | σs (Am²/kg) | Hc (kA/m) | Co CONTENT (%) | THICK- NESS (μm) |
| COMPARATIVE EXAMPLE 1 | – | – | – | 0 | 120 | 115 | 3 | 3 |
| COMPARATIVE EXAMPLE 2 | 135 | 135 | 10 | 3 | – | – | – | 0 |
| EXAMPLE 1 | ↑ | ↑ | ↑ | 0.01 | 120 | 115 | 3 | 1.0 |
| EXAMPLE 2 | ↑ | ↑ | ↑ | 0.3 | ↑ | ↑ | ↑ | 2.7 |
| EXAMPLE 3 | ↑ | ↑ | ↑ | 0.5 | ↑ | ↑ | ↑ | 4.0 |
| COMPARATIVE EXAMPLE 3 | ↑ | ↑ | ↑ | <0.01 | ↑ | ↑ | ↑ | 0.9 |
| COMPARATIVE EXAMPLE 4 | ↑ | ↑ | ↑ | <0.01 | ↑ | ↑ | ↑ | 4.0 |
| COMPARATIVE EXAMPLE 5 | ↑ | ↑ | ↑ | 0.6 | ↑ | ↑ | ↑ | 0.9 |
| COMPARATIVE EXAMPLE 6 | ↑ | ↑ | ↑ | 0.6 | ↑ | ↑ | ↑ | 4.1 |

\* SYMBOL "↑" SHOWN IN THE TABLE INDICATES THAT THE VALUE IS THE SAME AS THE IMMEDIATELY ABOVE VALUE. (THIS APPLIES TO THE TABLES BELOW.)

FIG. 16

|  | UPPER LAYER MAGNETIC POWDER | | | | LOWER LAYER MAGNETIC POWDER | | | |
|---|---|---|---|---|---|---|---|---|
|  | σs (Am²/kg) | Hc (kA/m) | Co CONTENT (%) | THICK- NESS (μm) | σs (Am²/kg) | Hc (kA/m) | Co CONTENT (%) | THICK- NESS (μm) |
| EXAMPLE 2 | 135 | 135 | 10 | 0.3 | 120 | 115 | 3 | 2.7 |
| EXAMPLE 4 | ↑ | ↑ | ↑ | ↑ | 120 | 125 | ↑ | ↑ |
| COMPARATIVE EXAMPLE 7 | ↑ | ↑ | ↑ | ↑ | 140 | 120 | ↑ | ↑ |

FIG. 17

|  | UPPER LAYER MAGNETIC POWDER | | | | LOWER LAYER MAGNETIC POWDER | | | |
|---|---|---|---|---|---|---|---|---|
|  | σs (Am²/kg) | Hc (kA/m) | Co CONTENT (%) | THICK-NESS (μm) | σs (Am²/kg) | Hc (kA/m) | Co CONTENT (%) | THICK-NESS (μm) |
| COMPARATIVE EXAMPLE 8 | 200 | 200 | 50 | 0.3 | 75 | 85 | 0 | 2.7 |
| EXAMPLE 5 | ↑ | ↑ | ↑ | ↑ | 80 | 90 | 0 | ↑ |
| EXAMPLE 6 | ↑ | ↑ | ↑ | ↑ | 120 | 115 | 3 | ↑ |
| EXAMPLE 7 | ↑ | ↑ | ↑ | ↑ | 150 | 180 | 5 | ↑ |
| COMPARATIVE EXAMPLE 9 | ↑ | ↑ | ↑ | ↑ | 155 | 185 | 30 | ↑ |
| COMPARATIVE EXAMPLE 10 | 205 | 210 | 55 | ↑ | 80 | 90 | 0 | ↑ |
| COMPARATIVE EXAMPLE 11 | ↑ | ↑ | ↑ | ↑ | 150 | 180 | 5 | ↑ |

FIG. 18

|  | UPPER LAYER MAGNETIC POWDER | | | | LOWER LAYER MAGNETIC POWDER | | | |
|---|---|---|---|---|---|---|---|---|
|  | σs (Am²/kg) | Hc (kA/m) | Co CONTENT (%) | THICK-NESS (μm) | σs (Am²/kg) | Hc (kA/m) | Co CONTENT (%) | THICK-NESS (μm) |
| COMPARATIVE EXAMPLE 12 | 95 | 95 | 3 | 0.3 | 80 | 90 | 0 | 2.7 |
| COMPARATIVE EXAMPLE 13 | ↑ | ↑ | ↑ | ↑ | 150 | 180 | 5 | ↑ |
| COMPARATIVE EXAMPLE 14 | 100 | 100 | ↑ | ↑ | 75 | 85 | 0 | ↑ |
| EXAMPLE 8 | ↑ | ↑ | ↑ | ↑ | 80 | 90 | 0 | ↑ |

FIG. 19

| | TAPE PROPERTIES | | | | | |
|---|---|---|---|---|---|---|
| | ELECTROMAGNETIC CONVERSION CHARACTERISTICS (OUTPUT) | | | | DURA-BILITY | WEATHER-ING RESIST-ANCE |
| | 46.98MHz | 1kHz | 12kHz | audio F-CHARACTERISTIC | HDW-500 | |
| COMPARATIVE EXAMPLE 1 | −4.0 | +1.3 | −0.5 | +0.8 | × | × |
| COMPARATIVE EXAMPLE 2 | −0.2 | −0.8 | +0.0 | −0.8 | ○ | ○ |
| EXAMPLE 1 | +1.5 | +0.0 | −0.6 | +0.6 | ○ | ○ |
| EXAMPLE 2 | +1.0 | +1.3 | +0.1 | +1.2 | ○ | ○ |
| EXAMPLE 3 | +0.0 | +1.4 | +0.2 | +1.2 | ○ | ○ |
| COMPARATIVE EXAMPLE 3 | −1.2 | −0.1 | −1.0 | +0.9 | ○ | ○ |
| COMPARATIVE EXAMPLE 4 | −1.2 | +1.3 | −0.4 | +1.7 | ○ | ○ |
| COMPARATIVE EXAMPLE 5 | −0.3 | −0.1 | −0.9 | +0.8 | ○ | ○ |
| COMPARATIVE EXAMPLE 6 | −0.3 | +1.2 | −0.3 | +1.5 | ○ | ○ |

FIG. 20

| | TAPE PROPERTIES | | | | | |
|---|---|---|---|---|---|---|
| | ELECTROMAGNETIC CONVERSION CHARACTERISTICS (OUTPUT) | | | | DURA-BILITY | WEATHER-ING RESIST-ANCE |
| | 46.98MHz | 1kHz | 12kHz | audio F-CHARACTERISTIC | HDW-500 | |
| EXAMPLE 2 | +1.0 | +1.3 | +0.1 | +1.2 | ○ | ○ |
| EXAMPLE 4 | +0.7 | +0.5 | +0.2 | +0.3 | ○ | ○ |
| COMPARATIVE EXAMPLE 7 | +0.6 | +0.6 | +0.3 | +0.3 | ○ | ○ |

FIG. 21

| | TAPE PROPERTIES | | | | | |
|---|---|---|---|---|---|---|
| | ELECTROMAGNETIC CONVERSION CHARACTERISTICS (OUTPUT) | | | | DURA-BILITY | WEATHER-ING RESIST-ANCE |
| | 46.98MHz | 1kHz | 12kHz | audio F-CHARACTERISTIC | HDW-500 | |
| COMPARATIVE EXAMPLE 8 | +0.0 | −0.9 | −1.0 | +0.1 | ○ | ○ |
| EXAMPLE 5 | +0.0 | −0.4 | −0.8 | +0.4 | ○ | ○ |
| EXAMPLE 6 | +0.0 | +0.0 | +0.0 | +0.0 | ○ | ○ |
| EXAMPLE 7 | +0.2 | −0.4 | +0.1 | −0.5 | ○ | ○ |
| COMPARATIVE EXAMPLE 9 | +0.1 | −1.0 | +0.2 | −1.2 | ○ | ○ |
| COMPARATIVE EXAMPLE 10 | −0.6 | −0.5 | −0.9 | +0.4 | ○ | ○ |
| COMPARATIVE EXAMPLE 11 | −0.6 | −0.8 | −0.1 | −0.7 | ○ | ○ |

FIG. 22

| | TAPE PROPERTIES | | | | | |
|---|---|---|---|---|---|---|
| | ELECTROMAGNETIC CONVERSION CHARACTERISTICS (OUTPUT) | | | | DURA-BILITY | WEATHER-ING RESIST-ANCE |
| | 46.98MHz | 1kHz | 12kHz | audio F-CHARACTERISTIC | HDW-500 | |
| COMPARATIVE EXAMPLE 12 | −0.5 | +0.0 | −0.1 | +0.1 | ○ | ○ |
| COMPARATIVE EXAMPLE 13 | −0.8 | −2.5 | −0.2 | −2.3 | ○ | ○ |
| COMPARATIVE EXAMPLE 14 | +0.0 | −0.6 | +0.1 | −0.7 | ○ | ○ |
| EXAMPLE 8 | +0.0 | +0.0 | +0.0 | +0.0 | ○ | ○ |

FIG. 23

| SAMPLE NO. | UPPER LAYER MAGNETIC POWDER | | | | LOWER LAYER MAGNETIC POWDER | | | |
|---|---|---|---|---|---|---|---|---|
| | $\sigma s$ (Am²/kg) | Hc (kA/m) | Co CONTENT (%) | THICK-NESS (μm) | $\sigma s$ (Am²/kg) | Hc (kA/m) | Co CONTENT (%) | THICK-NESS (μm) |
| 3-1 | 135 | 135 | 10 | 0.3 | 120 | 115 | 3 | 0.0 |
| 3-2 | ↑ | ↑ | ↑ | 0.3 | ↑ | ↑ | ↑ | 0.9 |
| 3-3 | ↑ | ↑ | ↑ | 0.3 | ↑ | ↑ | ↑ | 1.0 |
| 3-4 | ↑ | ↑ | ↑ | 0.3 | ↑ | ↑ | ↑ | 1.5 |
| 3-5 | ↑ | ↑ | ↑ | 0.3 | ↑ | ↑ | ↑ | 2.0 |
| 3-6 | ↑ | ↑ | ↑ | 0.3 | ↑ | ↑ | ↑ | 2.7 |
| 3-7 | ↑ | ↑ | ↑ | 0.3 | ↑ | ↑ | ↑ | 3.5 |
| 3-8 | ↑ | ↑ | ↑ | 0.3 | ↑ | ↑ | ↑ | 4.0 |
| 3-9 | ↑ | ↑ | ↑ | 0.3 | ↑ | ↑ | ↑ | 4.1 |
| 3-10 | ↑ | ↑ | ↑ | 0.3 | ↑ | ↑ | ↑ | 4.5 |

FIG. 24

| SAMPLE NO. | TAPE PROPERTIES | | | | | |
|---|---|---|---|---|---|---|
| | ELECTROMAGNETIC CONVERSION CHARACTERISTICS (OUTPUT) | | | | DURA-BILITY | WEATHER-ING RESIST-ANCE |
| | 46.98MHz | 1kHz | 12kHz | audio F-CHARACTERISTIC | HDW-500 | |
| 3-1 | -3.8 | -4.8 | -5.0 | +0.2 | ○ | ○ |
| 3-2 | -1.5 | -1.0 | -1.0 | +0.0 | ○ | ○ |
| 3-3 | -0.1 | +0.0 | -0.5 | +0.5 | ○ | ○ |
| 3-4 | +0.6 | +0.7 | -0.3 | +1.0 | ○ | ○ |
| 3-5 | +0.9 | +1.1 | +0.0 | +1.1 | ○ | ○ |
| 3-6 | +1.0 | +1.3 | +0.1 | +1.2 | ○ | ○ |
| 3-7 | +0.9 | +1.4 | +0.1 | +1.3 | ○ | ○ |
| 3-8 | +0.8 | +1.3 | +0.1 | +1.2 | ○ | ○ |
| 3-9 | +0.8 | +1.3 | +0.1 | +1.2 | ○ | ○ |
| 3-10 | +0.6 | +1.1 | +0.1 | +1.0 | ○ | ○ |

FIG. 25

| SAMPLE NO. | UPPER LAYER MAGNETIC POWDER | | | | LOWER LAYER MAGNETIC POWDER | | | |
|---|---|---|---|---|---|---|---|---|
| | σs (Am²/kg) | Hc (kA/m) | Co CONTENT (%) | THICK-NESS (μm) | σs (Am²/kg) | Hc (kA/m) | Co CONTENT (%) | THICK-NESS (μm) |
| 4-1 | 135 | 135 | 10 | 0 | 120 | 115 | 3 | 2.7 |
| 4-2 | ↑ | ↑ | ↑ | 0.009 | ↑ | ↑ | ↑ | 2.7 |
| 4-3 | ↑ | ↑ | ↑ | 0.01 | ↑ | ↑ | ↑ | 2.7 |
| 4-4 | ↑ | ↑ | ↑ | 0.1 | ↑ | ↑ | ↑ | 2.7 |
| 4-5 | ↑ | ↑ | ↑ | 0.2 | ↑ | ↑ | ↑ | 2.7 |
| 4-6 | ↑ | ↑ | ↑ | 0.3 | ↑ | ↑ | ↑ | 2.7 |
| 4-7 | ↑ | ↑ | ↑ | 0.4 | ↑ | ↑ | ↑ | 2.7 |
| 4-8 | ↑ | ↑ | ↑ | 0.5 | ↑ | ↑ | ↑ | 2.7 |
| 4-9 | ↑ | ↑ | ↑ | 0.51 | ↑ | ↑ | ↑ | 2.7 |
| 4-10 | ↑ | ↑ | ↑ | 0.55 | ↑ | ↑ | ↑ | 2.7 |

FIG. 26

| SAMPLE NO. | TAPE PROPERTIES | | | | | |
|---|---|---|---|---|---|---|
| | ELECTROMAGNETIC CONVERSION CHARACTERISTICS (OUTPUT) | | | | DURA-BILITY HDW-500 | WEATHER-ING RESIST-ANCE |
| | 46.98MHz | 1kHz | 12kHz | audio F-CHARACTERISTIC | | |
| 4-1 | -4.1 | +0.8 | +0.0 | +0.8 | ○ | ○ |
| 4-2 | -3.5 | +0.9 | +0.0 | +0.9 | ○ | ○ |
| 4-3 | -0.8 | +1.0 | +0.0 | +1.0 | ○ | ○ |
| 4-4 | +0.0 | +1.2 | +0.1 | +1.1 | ○ | ○ |
| 4-5 | +0.5 | +1.2 | +0.1 | +1.1 | ○ | ○ |
| 4-6 | +1.0 | +1.3 | +0.1 | +1.2 | ○ | ○ |
| 4-7 | +0.9 | +1.3 | +0.1 | +1.2 | ○ | ○ |
| 4-8 | +0.5 | +1.1 | +0.1 | +1.0 | ○ | ○ |
| 4-9 | +0.3 | +1.0 | +0.2 | +0.8 | ○ | ○ |
| 4-10 | -0.1 | +0.6 | +0.2 | +0.4 | ○ | ○ |

FIG. 27

| SAMPLE NO. | UPPER LAYER MAGNETIC POWDER | | | | LOWER LAYER MAGNETIC POWDER | | | |
|---|---|---|---|---|---|---|---|---|
| | σs (Am²/kg) | Hc (kA/m) | Co CONTENT (%) | THICK-NESS (μm) | σs (Am²/kg) | Hc (kA/m) | Co CONTENT (%) | THICK-NESS (μm) |
| 5-1 | 135 | 135 | 10 | 0.3 | 60 | 115 | 3 | 2.7 |
| 5-2 | ↑ | ↑ | ↑ | ↑ | 70 | ↑ | ↑ | ↑ |
| 5-3 | ↑ | ↑ | ↑ | ↑ | 80 | ↑ | ↑ | ↑ |
| 5-4 | ↑ | ↑ | ↑ | ↑ | 90 | ↑ | ↑ | ↑ |
| 5-5 | ↑ | ↑ | ↑ | ↑ | 100 | ↑ | ↑ | ↑ |
| 5-6 | 135 | 135 | 10 | 0.3 | 120 | 115 | 3 | 2.7 |
| 5-7 | ↑ | ↑ | ↑ | ↑ | 135 | ↑ | ↑ | ↑ |
| 5-8 | ↑ | ↑ | ↑ | ↑ | 140 | ↑ | ↑ | ↑ |
| 5-9 | ↑ | ↑ | ↑ | ↑ | 150 | ↑ | ↑ | ↑ |

FIG. 28

| SAMPLE NO. | TAPE PROPERTIES | | | | | |
|---|---|---|---|---|---|---|
| | ELECTROMAGNETIC CONVERSION CHARACTERISTICS (OUTPUT) | | | | DURA-BILITY HDW-500 | WEATHER-ING RESIST-ANCE |
| | 46.98MHz | 1kHz | 12kHz | audio F-CHARACTERISTIC | | |
| 5-1 | +0.1 | -4.2 | -3.1 | -1.1 | △ | △ |
| 5-2 | +0.2 | -3.5 | -3.0 | -0.5 | ○ | ○ |
| 5-3 | +0.5 | -1.5 | -1.6 | +0.1 | ○ | ○ |
| 5-4 | +0.7 | -0.5 | -0.9 | +0.4 | ○ | ○ |
| 5-5 | +0.8 | +0.3 | -0.5 | +0.8 | ○ | ○ |
| 5-6 | +1.0 | +1.3 | +0.1 | +1.2 | ○ | ○ |
| 5-7 | +0.9 | +1.6 | +0.4 | +1.2 | ○ | ○ |
| 5-8 | +0.5 | +1.7 | +0.9 | +1.8 | ○ | ○ |
| 5-9 | -0.1 | +1.7 | +1.2 | +0.5 | ○ | ○ |

FIG. 29

| SAMPLE NO. | UPPER LAYER MAGNETIC POWDER | | | | LOWER LAYER MAGNETIC POWDER | | | |
|---|---|---|---|---|---|---|---|---|
| | σs (Am²/kg) | Hc (kA/m) | Co CONTENT (%) | THICKNESS (μm) | σs (Am²/kg) | Hc (kA/m) | Co CONTENT (%) | THICKNESS (μm) |
| 6-1 | 135 | 135 | 10 | 0.3 | 120 | 80 | 3 | 2.7 |
| 6-2 | ↑ | ↑ | ↑ | ↑ | ↑ | 90 | ↑ | ↑ |
| 6-3 | ↑ | ↑ | ↑ | ↑ | ↑ | 100 | ↑ | ↑ |
| 6-4 | ↑ | ↑ | ↑ | ↑ | ↑ | 110 | ↑ | ↑ |
| 6-5 | 135 | 135 | 10 | 0.3 | 120 | 115 | ↑ | ↑ |
| 6-6 | ↑ | ↑ | ↑ | ↑ | ↑ | 121.9 | 3 | 2.7 |
| 6-7 | ↑ | ↑ | ↑ | ↑ | 120 | 125 | ↑ | ↑ |
| 6-8 | ↑ | ↑ | ↑ | ↑ | ↑ | 130 | ↑ | ↑ |
| 6-9 | ↑ | ↑ | ↑ | ↑ | ↑ | 140 | ↑ | ↑ |

FIG. 30

| SAMPLE NO. | TAPE PROPERTIES | | | | | |
|---|---|---|---|---|---|---|
| | ELECTROMAGNETIC CONVERSION CHARACTERISTICS (OUTPUT) | | | | DURABILITY | WEATHERING RESISTANCE |
| | 46.98MHz | 1kHz | 12kHz | audio F-CHARACTERISTIC | HDW-500 | |
| 6-1 | +0.5 | +1.8 | -1.0 | +2.8 | △ | △ |
| 6-2 | +1.0 | +1.8 | -0.7 | +2.5 | ○ | △ |
| 6-3 | +1.0 | +1.7 | -0.2 | +1.9 | ○ | ○ |
| 6-4 | +1.1 | +1.5 | -0.1 | +1.6 | ○ | ○ |
| 6-5 | +1.0 | +1.3 | +0.1 | +1.2 | ○ | ○ |
| 6-6 | +1.0 | +0.9 | +0.1 | +0.8 | ○ | ○ |
| 6-7 | +0.7 | +0.5 | +0.2 | +0.2 | ○ | ○ |
| 6-8 | +0.3 | +0.0 | +0.2 | -0.2 | ○ | ○ |
| 6-9 | -0.2 | -2.1 | +0.2 | -2.3 | ○ | ○ |

FIG. 31

| SAMPLE NO. | UPPER LAYER MAGNETIC POWDER | | | | LOWER LAYER MAGNETIC POWDER | | | |
|---|---|---|---|---|---|---|---|---|
| | $\sigma s$ (Am²/kg) | Hc (kA/m) | Co CONTENT (%) | THICK-NESS (μm) | $\sigma s$ (Am²/kg) | Hc (kA/m) | Co CONTENT (%) | THICK-NESS (μm) |
| 7-1 | 90 | 135 | 10 | 0.3 | 60 | 115 | 3 | 2.7 |
| 7-2 | 100 | ↑ | ↑ | ↑ | ↑ | ↑ | ↑ | ↑ |
| 7-3 | 110 | ↑ | ↑ | ↑ | ↑ | ↑ | ↑ | ↑ |
| 7-4 | 120 | ↑ | ↑ | ↑ | ↑ | ↑ | ↑ | ↑ |
| 7-5 | 135 | 135 | 10 | 0.3 | 120 | 115 | 3 | 2.7 |
| 7-6 | 150 | ↑ | ↑ | ↑ | ↑ | ↑ | ↑ | ↑ |
| 7-7 | 190 | ↑ | ↑ | ↑ | ↑ | ↑ | ↑ | ↑ |
| 7-8 | 200 | ↑ | ↑ | ↑ | ↑ | ↑ | ↑ | ↑ |
| 7-9 | 210 | ↑ | ↑ | ↑ | ↑ | ↑ | ↑ | ↑ |

FIG. 32

| SAMPLE NO. | TAPE PROPERTIES | | | | DURA-BILITY HDW-500 | WEATHER-ING RESIST-ANCE |
|---|---|---|---|---|---|---|
| | ELECTROMAGNETIC CONVERSION CHARACTERISTICS (OUTPUT) | | | | | |
| | 46.98MHz | 1kHz | 12kHz | audio F-CHARACTERISTIC | | |
| 7-1 | -2.6 | +1.0 | -0.1 | +1.1 | △ | △ |
| 7-2 | -1.0 | +1.3 | -0.1 | +1.4 | ○ | ○ |
| 7-3 | +0.1 | +1.3 | +0.0 | +1.3 | ○ | ○ |
| 7-4 | +0.8 | +1.3 | +0.0 | +1.3 | ○ | ○ |
| 7-5 | +1.0 | +1.3 | +0.1 | +1.2 | ○ | ○ |
| 7-6 | +0.9 | +1.0 | +0.1 | +0.9 | ○ | ○ |
| 7-7 | +0.5 | +0.0 | +0.1 | -0.1 | ○ | ○ |
| 7-8 | +0.2 | -0.3 | +0.0 | -0.3 | ○ | ○ |
| 7-9 | -0.2 | -1.1 | +0.0 | -1.1 | △ | × |

FIG. 33

| SAMPLE NO. | UPPER LAYER MAGNETIC POWDER | | | | LOWER LAYER MAGNETIC POWDER | | | |
|---|---|---|---|---|---|---|---|---|
| | σs (Am²/kg) | Hc (kA/m) | Co CONTENT (%) | THICK- NESS (μm) | σs (Am²/kg) | Hc (kA/m) | Co CONTENT (%) | THICK- NESS (μm) |
| 8-1 | 135 | 90 | 10 | 0.3 | 120 | 115 | 3 | 2.7 |
| 8-2 | ↑ | 100 | ↑ | ↑ | ↑ | ↑ | ↑ | ↑ |
| 8-3 | ↑ | 120 | ↑ | ↑ | ↑ | ↑ | ↑ | ↑ |
| 8-4 | ↑ | 127.8 | ↑ | ↑ | ↑ | ↑ | ↑ | ↑ |
| 8-5 | ↑ | 130 | ↑ | ↑ | ↑ | ↑ | ↑ | ↑ |
| 8-6 | 135 | 135 | 10 | 0.3 | 120 | 115 | 3 | 2.7 |
| 8-7 | 135 | 180 | ↑ | ↑ | ↑ | ↑ | ↑ | ↑ |
| 8-8 | ↑ | 190 | ↑ | ↑ | ↑ | ↑ | ↑ | ↑ |
| 8-9 | ↑ | 200 | ↑ | ↑ | ↑ | ↑ | ↑ | ↑ |
| 8-10 | ↑ | 210 | ↑ | ↑ | ↑ | ↑ | ↑ | ↑ |

FIG. 34

| SAMPLE NO. | TAPE PROPERTIES | | | | DURA- BILITY HDW-500 | WEATHER- ING RESIST- ANCE |
|---|---|---|---|---|---|---|
| | ELECTROMAGNETIC CONVERSION CHARACTERISTICS (OUTPUT) | | | audio F- CHARACTERISTIC | | |
| | 46.98MHz | 1kHz | 12kHz | | | |
| 8-1 | -2.0 | +1.0 | +0.3 | +0.7 | △ | △ |
| 8-2 | -1.0 | +1.2 | +0.2 | +1.0 | ○ | △ |
| 8-3 | +0.5 | +1.4 | +0.2 | +1.2 | ○ | ○ |
| 8-4 | +0.8 | +1.4 | +0.2 | +1.2 | ○ | ○ |
| 8-5 | +0.9 | +1.4 | +0.1 | +1.3 | ○ | ○ |
| 8-6 | +1.0 | +1.3 | +0.1 | +1.2 | ○ | ○ |
| 8-7 | +1.2 | +0.9 | +0.0 | +0.9 | ○ | ○ |
| 8-8 | +1.2 | +0.7 | +0.0 | +0.7 | ○ | ○ |
| 8-9 | +0.8 | +0.0 | -0.2 | +0.2 | ○ | ○ |
| 8-10 | +0.0 | -1.0 | -0.5 | -0.5 | ○ | × |

FIG. 35

| SAMPLE NO. | UPPER LAYER MAGNETIC POWDER | | | | LOWER LAYER MAGNETIC POWDER | | | | $\sigma s(A)/\sigma s(B)$ |
|---|---|---|---|---|---|---|---|---|---|
| | $\sigma s$ (Am²/kg) | Hc (kA/m) | Co CONTENT (%) | THICK-NESS (μm) | $\sigma s$ (Am²/kg) | Hc (kA/m) | Co CONTENT (%) | THICK-NESS (μm) | |
| 9-1 | 135 | 135 | 10 | 0.3 | 60 | 115 | 3 | 2.7 | 0.44 |
| 9-2 | 135 | ↑ | ↑ | ↑ | 70 | ↑ | ↑ | ↑ | 0.52 |
| 9-3 | 135 | ↑ | ↑ | ↑ | 80 | ↑ | ↑ | ↑ | 0.59 |
| 9-4 | 135 | ↑ | ↑ | ↑ | 90 | ↑ | ↑ | ↑ | 0.67 |
| 9-5 | 135 | ↑ | ↑ | ↑ | 100 | ↑ | ↑ | ↑ | 0.74 |
| 9-6 | 135 | 135 | 10 | 0.3 | 120 | 115 | 3 | 2.7 | 0.89 |
| 9-7 | 135 | ↑ | ↑ | ↑ | 135 | ↑ | ↑ | ↑ | 1 |
| 9-8 | 135 | ↑ | ↑ | ↑ | 140 | ↑ | ↑ | ↑ | 1.04 |
| 9-9 | 135 | ↑ | ↑ | ↑ | 150 | ↑ | ↑ | ↑ | 1.11 |

FIG. 36

| SAMPLE NO. | TAPE PROPERTIES | | | | | |
|---|---|---|---|---|---|---|
| | ELECTROMAGNETIC CONVERSION CHARACTERISTICS (OUTPUT) | | | | DURA-BILITY HDW-500 | WEATHER-ING RESIST-ANCE |
| | 46.98MHz | 1kHz | 12kHz | audio F-CHARACTERISTIC | | |
| 9-1 | +0.1 | -4.2 | -3.1 | -1.1 | △ | △ |
| 9-2 | +0.2 | -3.5 | -3.0 | -0.5 | ○ | ○ |
| 9-3 | +0.5 | -1.5 | -1.6 | +0.1 | ○ | ○ |
| 9-4 | +0.7 | -0.5 | -0.9 | +0.4 | ○ | ○ |
| 9-5 | +0.8 | +0.3 | -0.5 | +0.8 | ○ | ○ |
| 9-6 | +1.0 | +1.3 | +0.1 | +1.2 | ○ | ○ |
| 9-7 | +0.9 | +1.6 | +0.4 | +1.2 | ○ | ○ |
| 9-8 | +0.5 | +1.7 | +0.9 | +0.8 | ○ | ○ |
| 9-9 | -0.1 | +1.7 | +1.2 | +0.5 | ○ | ○ |

FIG. 37

| SAMPLE NO. | UPPER LAYER MAGNETIC POWDER | | | | LOWER LAYER MAGNETIC POWDER | | | | σs(A)/σs(B) |
|---|---|---|---|---|---|---|---|---|---|
| | σs (Am²/kg) | Hc (kA/m) | Co CONTENT (%) | THICK-NESS (μm) | σs (Am²/kg) | Hc (kA/m) | Co CONTENT (%) | THICK-NESS (μm) | |
| 10-1 | 90 | 135 | 10 | 0.3 | 120 | 115 | 3 | 2.7 | 1.33 |
| 10-2 | 100 | ↑ | ↑ | ↑ | 120 | ↑ | ↑ | ↑ | 1.20 |
| 10-3 | 110 | ↑ | ↑ | ↑ | 120 | ↑ | ↑ | ↑ | 1.09 |
| 10-4 | 120 | ↑ | ↑ | ↑ | 120 | ↑ | ↑ | ↑ | 1.00 |
| 10-5 | 135 | 135 | 10 | 0.3 | 120 | 115 | 3 | 2.7 | 0.89 |
| 10-6 | 150 | ↑ | ↑ | ↑ | 120 | ↑ | ↑ | ↑ | 0.80 |
| 10-7 | 190 | ↑ | ↑ | ↑ | 120 | ↑ | ↑ | ↑ | 0.63 |
| 10-8 | 200 | ↑ | ↑ | ↑ | 120 | ↑ | ↑ | ↑ | 0.60 |
| 10-9 | 210 | ↑ | ↑ | ↑ | 120 | ↑ | ↑ | ↑ | 0.57 |

FIG. 38

| SAMPLE NO. | TAPE PROPERTIES | | | | DURA-BILITY HDW-500 | WEATHER-ING RESIST-ANCE |
|---|---|---|---|---|---|---|
| | ELECTROMAGNETIC CONVERSION CHARACTERISTICS (OUTPUT) | | | | | |
| | 46.98MHz | 1kHz | 12kHz | audio F-CHARACTERISTIC | | |
| 10-1 | -2.6 | +1.0 | -0.1 | +1.1 | △ | △ |
| 10-2 | -1.0 | +1.3 | -0.1 | +1.4 | ○ | ○ |
| 10-3 | +0.1 | +1.3 | +0.0 | +1.3 | ○ | ○ |
| 10-4 | +0.8 | +1.3 | +0.0 | +1.3 | ○ | ○ |
| 10-5 | +1.0 | +1.3 | +0.1 | +1.2 | ○ | ○ |
| 10-6 | +0.9 | +1.0 | +0.1 | +0.9 | ○ | ○ |
| 10-7 | +0.5 | +0.0 | +0.1 | -0.1 | ○ | ○ |
| 10-8 | +0.2 | -0.3 | +0.0 | -0.3 | ○ | ○ |
| 10-9 | -0.2 | -1.1 | +0.0 | -1.1 | ○ | × |

FIG. 39

| SAMPLE NO. | UPPER LAYER MAGNETIC POWDER | | | | LOWER LAYER MAGNETIC POWDER | | | | Hc(A)/ Hc(B) |
|---|---|---|---|---|---|---|---|---|---|
| | σs (Am²/kg) | Hc (kA/m) | Co CONTENT (%) | THICK-NESS (μm) | σs (Am²/kg) | Hc (kA/m) | Co CONTENT (%) | THICK-NESS (μm) | |
| 11-1 | 135 | 135 | 10 | 0.3 | 120 | 80 | 3 | 2.7 | 0.59 |
| 11-2 | 135 | 135 | 10 | 0.3 | 120 | 90 | ↑ | ↑ | 0.67 |
| 11-3 | 135 | 135 | 10 | 0.3 | 120 | 100 | ↑ | ↑ | 0.74 |
| 11-4 | 135 | 135 | 10 | 0.3 | 120 | 110 | ↑ | ↑ | 0.81 |
| 11-5 | 135 | 135 | 10 | 0.3 | 120 | 115 | 3 | 2.7 | 0.85 |
| 11-6 | 135 | 135 | 10 | 0.3 | 120 | 121.9 | ↑ | ↑ | 0.90 |
| 11-7 | 135 | 135 | 10 | 0.3 | 120 | 125 | ↑ | ↑ | 0.93 |
| 11-8 | 135 | 135 | 10 | 0.3 | 120 | 130 | ↑ | ↑ | 0.96 |
| 11-9 | 135 | 135 | 10 | 0.3 | 120 | 140 | ↑ | ↑ | 1.04 |

FIG. 40

| SAMPLE NO. | TAPE PROPERTIES | | | | DURA-BILITY HDW-500 | WEATHER-ING RESIST-ANCE |
|---|---|---|---|---|---|---|
| | ELECTROMAGNETIC CONVERSION CHARACTERISTICS (OUTPUT) | | | | | |
| | 46.98MHz | 1kHz | 12kHz | audio F-CHARACTERISTIC | | |
| 11-1 | +0.5 | +1.8 | -1.0 | +2.8 | △ | △ |
| 11-2 | +1.0 | +1.8 | -0.7 | +2.5 | ○ | ○ |
| 11-3 | +1.0 | +1.7 | -0.2 | +1.9 | ○ | ○ |
| 11-4 | +1.1 | +1.5 | -0.1 | +1.6 | ○ | ○ |
| 11-5 | +1.0 | +1.3 | +0.1 | +1.2 | ○ | ○ |
| 11-6 | +1.0 | +0.9 | +0.1 | +0.8 | ○ | ○ |
| 11-7 | +0.7 | +0.5 | +0.2 | +0.3 | ○ | ○ |
| 11-8 | -0.3 | +0.0 | +0.2 | -0.2 | ○ | ○ |
| 11-9 | -0.2 | -2.1 | +0.2 | -2.3 | ○ | ○ |

FIG. 41

| SAMPLE NO. | UPPER LAYER MAGNETIC POWDER | | | | LOWER LAYER MAGNETIC POWDER | | | | Hc(A)/Hc(B) |
|---|---|---|---|---|---|---|---|---|---|
| | σs (Am²/kg) | Hc (kA/m) | Co CONTENT (%) | THICK-NESS (μm) | σs (Am²/kg) | Hc (kA/m) | Co CONTENT (%) | THICK-NESS (μm) | |
| 12-1 | 135 | 90 | 10 | 0.3 | 120 | 115 | 3 | 2.7 | 1.28 |
| 12-2 | 135 | 100 | 10 | 0.3 | 120 | 115 | ↑ | ↑ | 1.15 |
| 12-3 | 135 | 120 | 10 | 0.3 | 120 | 115 | ↑ | ↑ | 0.96 |
| 12-4 | 135 | 127.8 | 10 | 0.3 | 120 | 115 | ↑ | ↑ | 0.90 |
| 12-5 | 135 | 130 | 10 | 0.3 | 120 | 115 | ↑ | ↑ | 0.88 |
| 12-6 | 135 | 180 | 10 | 0.3 | 120 | 115 | 3 | 2.7 | 0.85 |
| 12-7 | 135 | 190 | 10 | 0.3 | 120 | 115 | ↑ | ↑ | 0.64 |
| 12-8 | 135 | 200 | 10 | 0.3 | 120 | 115 | ↑ | ↑ | 0.61 |
| 12-9 | 135 | 210 | 10 | 0.3 | 120 | 115 | ↑ | ↑ | 0.58 |
| 12-10 | 135 | 210 | 10 | 0.3 | 120 | 115 | ↑ | ↑ | 0.55 |

FIG. 42

| SAMPLE NO. | TAPE PROPERTIES | | | | | |
|---|---|---|---|---|---|---|
| | ELECTROMAGNETIC CONVERSION CHARACTERISTICS (OUTPUT) | | | | DURABILITY HDW-500 | WEATHERING RESISTANCE |
| | 46.98MHz | 1kHz | 12kHz | audio F-CHARACTERISTIC | | |
| 12-1 | -2.0 | +1.0 | +0.3 | +0.7 | △ | △ |
| 12-2 | -1.0 | +1.2 | +0.2 | +1.0 | ○ | △ |
| 12-3 | +0.5 | +1.4 | +0.2 | +1.2 | ○ | ○ |
| 12-4 | +0.8 | +1.4 | +0.2 | +1.2 | ○ | ○ |
| 12-5 | +0.9 | +1.4 | +0.1 | +1.3 | ○ | ○ |
| 12-6 | +1.0 | +1.3 | +0.1 | +1.2 | ○ | ○ |
| 12-7 | +1.2 | +0.9 | +0.0 | +0.9 | ○ | ○ |
| 12-8 | +1.2 | +0.7 | +0.0 | +0.7 | ○ | ○ |
| 12-9 | +0.8 | +0.0 | -0.2 | +0.2 | ○ | ○ |
| 12-10 | +0.0 | -1.0 | -0.5 | -0.5 | ○ | × |

FIG. 43

| SAMPLE NO. | UPPER LAYER MAGNETIC POWDER | | | | LOWER LAYER MAGNETIC POWDER | | | | Hc(A)/ Hc(B) |
|---|---|---|---|---|---|---|---|---|---|
| | σs (Am²/kg) | Hc (kA/m) | Co CONTENT (%) | THICK-NESS (μm) | σs (Am²/kg) | Hc (kA/m) | Co CONTENT (%) | THICK-NESS (μm) | |
| 13-1 | 120 | 130 | 5 | 0.5 | 110 | 80 | 0 | 2.5 | 0.62 |
| 13-2 | ↑ | ↑ | ↑ | ↑ | ↑ | 90 | 0 | ↑ | 0.69 |
| 13-3 | ↑ | ↑ | ↑ | ↑ | ↑ | 100 | 0 | ↑ | 0.77 |
| 13-4 | ↑ | ↑ | ↑ | ↑ | ↑ | 110 | 0 | ↑ | 0.85 |
| 13-5 | ↑ | ↑ | ↑ | ↑ | ↑ | 117 | 0 | ↑ | 0.90 |
| 13-6 | ↑ | ↑ | ↑ | ↑ | ↑ | 120 | 0 | ↑ | 0.92 |
| 13-7 | ↑ | ↑ | ↑ | ↑ | ↑ | 125 | 0 | ↑ | 0.96 |
| 13-8 | ↑ | ↑ | ↑ | ↑ | ↑ | 130 | 0 | ↑ | 1.00 |
| 13-9 | ↑ | ↑ | ↑ | ↑ | ↑ | 132 | 0 | ↑ | 1.02 |
| 13-10 | ↑ | ↑ | ↑ | ↑ | ↑ | 135 | 0 | ↑ | 1.04 |
| 13-11 | ↑ | ↑ | ↑ | ↑ | ↑ | 140 | 0 | ↑ | 1.08 |

FIG. 44

| SAMPLE NO. | TAPE PROPERTIES | | | | DURA-BILITY HDW-500 | WEATHER-ING RESIST-ANCE |
|---|---|---|---|---|---|---|
| | ELECTROMAGNETIC CONVERSION CHARACTERISTICS (OUTPUT) | | | | | |
| | 46.98MHz | 1kHz | 12kHz | audio F-CHARACTERISTIC | | |
| 13-1 | +0.2 | +1.6 | -1.1 | +2.7 | △ | △ |
| 13-2 | +0.8 | +1.4 | -0.6 | +2.0 | ○ | △ |
| 13-3 | +0.9 | +1.2 | -1.4 | +1.6 | ○ | ○ |
| 13-4 | +0.9 | +1.1 | -0.2 | +1.3 | ○ | ○ |
| 13-5 | +0.8 | +1.0 | -0.2 | +1.2 | ○ | ○ |
| 13-6 | +0.8 | +0.8 | -0.1 | +0.9 | ○ | ○ |
| 13-7 | +0.6 | +0.5 | -0.1 | +0.6 | ○ | ○ |
| 13-8 | +0.4 | +0.0 | +0.0 | +0.0 | ○ | ○ |
| 13-9 | +0.1 | -0.4 | +0.1 | -0.5 | ○ | ○ |
| 13-10 | -0.4 | -1.0 | +0.2 | -1.2 | ○ | ○ |
| 13-11 | -0.8 | -1.8 | +0.3 | -2.1 | ○ | ○ |

MAGNETIC RECORDING MEDIUM

The subject matter of application Ser. No. 10/422.720, is incorporated herein by reference. The persent application is a continuation of U.S. application Ser. No. 10/442,720, filed May 21, 2003, now U.S. Pat. No. 6,929,850, which claims priority to Japanese Patent Application No. JP2002-173544, filed Jun. 14, 2002, and Japanese Patent Application No. JP2003-005227, filed Jan. 14, 2003. The present application claims priority to these previously filed applications.

BACKGROUND OF THE INVENTION

1. Field of the Invention

The present invention relates to a magnetic recording medium.

2. Description of Related Art

Recently, digital broadcasting and data broadcasting are being spread in the television broadcasting filed, and, as magnetic recording media for audio and video signals, recording media products which can record or reproduce digital data are becoming a mainstream.

Now, it is a period of transition from analog era to digital era, and therefore a video tape recorder (VTR) or a data tape drive which can reproduce and edit both the old analog data and the new digital data is convenient, and VTR and data tape drive systems that can be used for analog and digital data are available.

Many of currently available digital VTRs and data tape drives for commercial use or for broadcasting use are designed to use a format to record digital signals and time code, i.e., time signals as well as analog audio signals simultaneously.

However, there is a difference in the frequency and depth of the recorded signal between the digital signals and the analog audio signals. Therefore, it is difficult to secure excellent properties of all the signals, and a number of vigorous studies are being made on the magnetic recording media.

For example, there is a method in which a magnetic coating composition comprising finely divided magnetic powder, which can achieve digital recording at shorter wavelengths, is applied so that the resultant magnetic layer has a thickness of 2 to 5 $\mu$m which corresponds to the depth used for analog recording.

However, this method has a problem in that the too large thickness of the magnetic layer lowers the output in electromagnetic conversion characteristics, that is, a problem of self-demagnetization due to the large thickness.

As a method for solving the above-mentioned problem, a technique is generally used in which a thick nonmagnetic layer is formed as a lower layer on the surface of the nonmagnetic support, and a magnetic layer is formed as an upper layer on the nonmagnetic layer so that the thickness of the magnetic layer is reduced to suppress demagnetization due to the large thickness, achieving a larger output. However, this method is unsuitable for analog signals since the lower layer is nonmagnetic.

On the other hand, there is a Mag-on-Mag method in which a magnetic layer suitable for analog recording is formed as a lower layer, and another magnetic layer suitable for digital recording is applied onto the lower layer to enable both analog recording and digital recording (see, for example, the below-listed Patent document 1 or 2). This technique of forming the above multi-layered magnetic layer has a feature such that the magnetic recording medium is designed so that the analog audio signals having longer wavelengths that need a recording frequency as low as about 1 KHz are recorded on the magnetic recording medium in a depth of 2 to 3 $\mu$m, and video signals having shorter wavelengths that need a recording frequency as high as several to several tens MHz are recorded on the magnetic recording medium at the surface layer in a depth of 0.3 $\mu$m or less.

Specifically, this is a method in which the upper layer is formed from magnetic powder of fine particle suitable for the higher recording frequency, the lower layer is formed from another magnetic powder having magnetic properties such that a satisfactory output can be obtained even in a longer wavelength region, and the two types of magnetic layers are stacked on one another.

See [Patent document 1]: Unexamined Japanese Patent Application Laid-Open Specification No. 53-54002 (page 2, right-hand upper column, line 10 to left-hand lower column, line 1, and FIG. 1).

See [Patent document 1]: Unexamined Japanese Patent Application Laid-Open Specification No. 3-62315 (page 2, right-hand upper column, line 8 to right-hand lower column, line 20, and FIG. 1).

Various types of Mag-on-Mag methods have conventionally been studied, and a number of studies have been made on VHS and the like in a format such that video signals are overwritten on audio signals, but, due to the above-mentioned problem of self demagnetization, for bringing the magnetic recording media produced by this method into practical use, there are restrictions of the sizes and magnetic properties of the magnetic materials used for the upper and lower layers and the thickness and construction of the individual layers.

SUMMARY OF THE INVENTION

A task of the present invention is to provide a magnetic recording medium which can record both digital signals and analog signals by, e.g., VTR for commercial use or for broadcasting use, and which can improve their electromagnetic conversion characteristics.

Specifically, in the present invention, there is provided a magnetic recording medium which comprises a nonmagnetic support, a first magnetic layer comprised of magnetic powder (A), and a second magnetic layer comprised of magnetic powder (B), wherein the first and second magnetic layers are formed on the nonmagnetic support in this order, wherein the magnetic powder (A) used in the first magnetic layer has the following characteristics:

a saturation magnetization $\sigma s(A)$ of 80 to 150 Am$^2$/kg; and a coercive force Hc(A) of 90 to 180 kA/m, wherein the magnetic powder (B) used in the second magnetic layer has the following characteristics:

a saturation magnetization $\sigma s(B)$ of 100 to 200 Am$^2$/kg; and a coercive force Hc(B) of 100 to 200 kA/m, wherein the first and second magnetic layers satisfy the following relationships:

$\sigma s(A)/\sigma s(B) \leq 1.0$, and $Hc(A)/Hc(B) \leq 1.0$, wherein the first magnetic layer has a thickness T(A) in the range represented by the following formula:

$1.0\ \mu m \leq T(A) \leq 4.0\ \mu m$, and wherein the second magnetic layer has a thickness T(B) in the range represented by the following formula:

$0.01\ \mu m \leq T(B) \leq 0.5\ \mu m$.

According to the present invention, the ranges of the saturation magnetization σs(A) and coercive force Hc(A) of the magnetic powder (A) used in the first magnetic layer (lower layer) and the ranges of the saturation magnetization σs(B) and coercive force Hc(B) of the magnetic powder (B) used in the second magnetic layer (upper layer) are individually defined as mentioned above. Therefore, not only be the format of digital recording met, but also the properties of deep layer recording for analog audio can be simultaneously improved. Particularly, close studies have been made on the properties of the magnetic powder used in each of the first magnetic layer (lower layer) and the second magnetic layer (upper layer). As a result, it has been found that, when the ratio of the thickness of the second magnetic layer (upper layer) to the thickness of the first magnetic layer (lower layer) is extremely reduced as mentioned above, the resultant magnetic recording medium can record both digital signals and analog signals and improve their electromagnetic conversion characteristics.

Specifically, there can be realized a magnetic recording medium which can record both digital signals and analog signals by, e.g., VTR for commercial use or for broadcasting use, and which can improve their electromagnetic conversion characteristics.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 3 is a graph showing the range of the coercive force Hc of the magnetic powder used in the magnetic layer in the magnetic recording medium;

FIG. 12 is a graph showing the electromagnetic conversion characteristics in the Example of the present invention when the Hc(A)/Hc(B) ratio was changed;

FIGS. 15 to 44 are tables (Tables 1 to 30) showing the formulations of the upper layer magnetic powder and the lower layer magnetic powder used in the cassette tapes prepared in the Examples and Comparative Examples, and the results of the measurement of properties of the cassette tapes.

DESCRIPTION OF THE PREFERRED EMBODIMENTS

Figure 1:
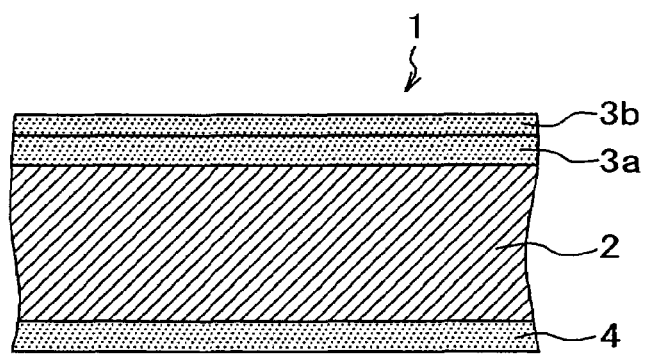
FIG. 1 is a diagrammatic cross-sectional view of a magnetic recording medium according to one embodiment of the present invention.

As shown in the diagrammatic cross-sectional view of FIG. 1 of a magnetic recording medium of the present invention, a magnetic recording medium 1 of the present invention comprises a nonmagnetic support 2, a first magnetic layer (lower layer) 3a comprised of magnetic powder, and a second magnetic layer (upper layer) 3b comprised of magnetic powder, wherein the first and second magnetic layers are formed on the nonmagnetic support in this order. If desired, a back coat layer 4 may be formed on another surface of the nonmagnetic support 2 that is not the surface on which the magnetic layers 3 are formed.

Figure 2:
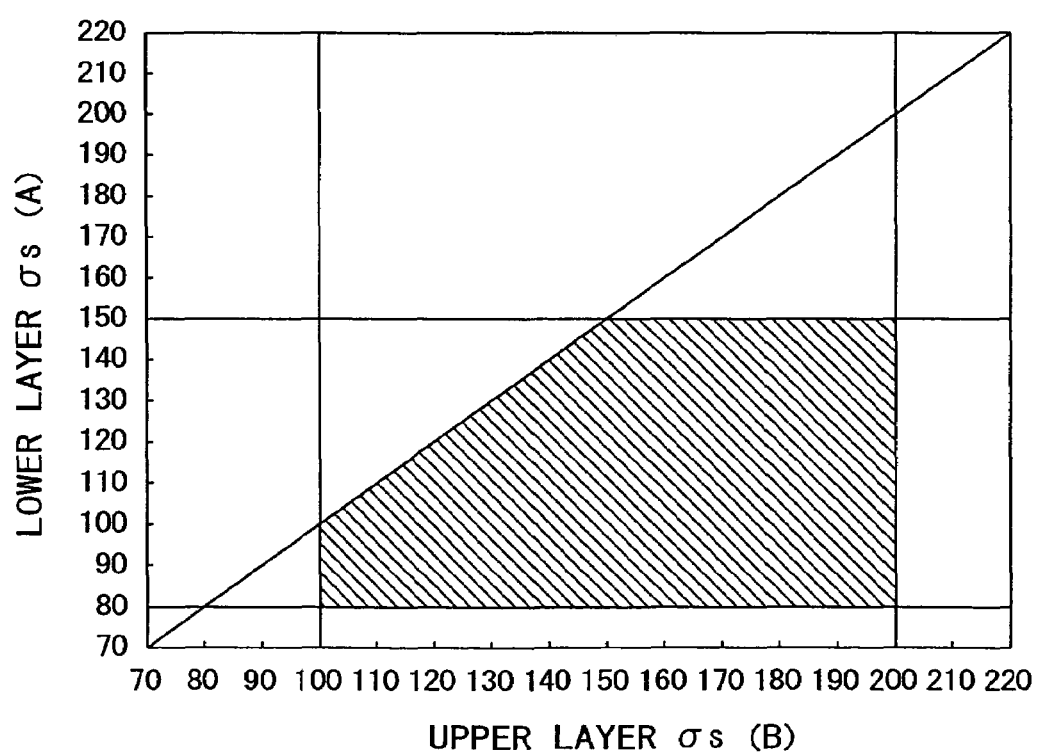
FIG. 2 is a graph showing the range of the saturation magnetization σs of the magnetic powder used in the magnetic layer in the magnetic recording medium.

With respect to the range of saturation magnetization σs:
In the magnetic recording medium of the present invention, the ferromagnetic fine powder usable in each of the first magnetic layer (lower layer) and the second magnetic layer (upper layer) is acicular Fe (so-called metal magnetic powder). Specifically, the metal magnetic powder having a saturation magnetization σs which falls within the above-mentioned range, namely, the shaded area shown in FIG. 2 is appropriately selected and used. The saturation magnetization σs indicates the magnetic energy inherent in the individual magnetic powder.

When the saturation magnetization σs(A) of the magnetic powder used in the first magnetic layer (lower layer) exceeds 150 Am²/kg, the effect of demagnetization is increased. Further, for securing excellent electromagnetic conversion characteristics of analog signals, it is necessary that the σs(A) be 80 Am²/kg or more and the thickness of the first magnetic layer be 1.0 to 4.0 μm.

For recording digital signals with higher density, the ferromagnetic fine powder usable in the second magnetic layer (upper layer) needs a higher saturation magnetization σs(B). For example, in video tapes in a format of, e.g., 8 mm currently used, ED-beta or beta-cam SP, or digital beta-cam, the ferromagnetic powder having a σs(B) of 100 to 150 Am²/kg is effective. In high capacity data storage DTF-2 and the like, the ferromagnetic powder having a σs(B) of 150 to 200 Am²/kg is effective. The metal magnetic powder having a σs(B) of higher than 200 Am²/kg has too high cohesion and hence has poor dispersibility, and therefore this metal magnetic powder is not suitable for coating the second magnetic layer (upper layer) in a thin film form.

It is desired that the saturation magnetization σs(A) of the first magnetic layer is lower than the saturation magnetization σs(B) of the second magnetic layer. When the σs(A) is higher than the σs(B), a loss due to the above-mentioned self demagnetization (deterioration of the magnetic properties and electromagnetic conversion characteristics of the magnetic recording medium) is likely to occur.

With respect to the range of coercive force Hc:

In the magnetic recording medium of the present invention, as the ferromagnetic fine powder usable in each of the first magnetic layer (lower layer) and the second magnetic layer (upper layer), the metal magnetic powder having a coercive force Hc which falls within the above-mentioned range, namely, the shaded area shown in FIG. 3 is appropriately selected and used.

When the coercive force Hc(A) of the first magnetic layer (lower layer) falls outside of the above range, the electromagnetic conversion characteristics of analog signals deteriorate similarly when the σs falls outside of the above corresponding range. Further, in the magnetic recording medium of the present invention, for example, Fe-based metal magnetic powder is used in both the upper and lower layers, and therefore the lower limit of the Hc(A) of the lower layer is about 90 kA/m.

On the other hand, the upper limit of the coercive force Hc(B) can be increased by, for example, increasing the Co content of the magnetic powder, but, taking into consideration of the format of the VTR or data tape drive, when the Hc(B) is higher than 200 kA/m, the recording current is not appropriate, causing a problem that the erase properties are poor.

With respect to the analog audio frequency characteristic, when the coercive force Hc(A) of the lower layer is lower, the output at a frequency as low as 1 kHz is considerably increased and the output at a frequency as high as 12 kHz tends to be lowered. Further, the analog audio output depends on the residual magnetic flux density (Br) of the lower layer, and therefore, when magnetic powder having larger magnetic energy and higher saturation magnetization σs is used, the output is likely to be affected by the residual magnetic flux density.

The present inventors have made studies closely on this phenomenon. As a result, they have found for the first time that this phenomenon is remarkable when the difference in the Hc between the upper layer and the lower layer is too large. That is, they have found that, when the difference in the Hc between the upper layer and the lower layer is smaller, the analog audio frequency characteristic can be effectively flatten.

With respect to the more advantageous range of the coercive force Hc, the upper layer and the lower layer satisfy the following relationship:

$0.8 \leq Hc(A)/Hc(B) \leq 1.0$, more preferably, $0.85 \leq Hc(A)/Hc(B) \leq 1.0$.

For obtaining excellent sensitivity (output at 1 kHz) in the analog signal properties, it is effective that the Hc(A) of the lower layer is 90% or less of the Hc(B) of the upper layer.

With respect to the Co content:

As mentioned above, the ferromagnetic fine powder usable in the magnetic recording medium of the present invention is acicular metal magnetic powder, and preferably contains cobalt (Co) so as to meet a predetermined requirement.

The Co contained in the magnetic powder in the second magnetic layer (upper layer) contributes to improvement of the Hc(B) and σs(B) and reduction in the crystallite size, and further it effectively avoids lowering of Δσs, which indicates the storage stability of the magnetic recording medium, but, when the Co content of the magnetic powder is less than 3 at. %, the above effects cannot be obtained satisfactorily. On the other hand, when the Co content of the magnetic powder exceeds 50 at. %, the coercive force Hc(B) is lowered. Therefore, the Co content of the magnetic powder in the upper layer may be 3 to 50 at. %, more preferably 5 to 40 at. %, further preferably 5 to 35 at. %. The unit "at. %" means an atom percentage.

On the other hand, it is preferred that the Co content of the magnetic powder in the first magnetic layer (lower layer) is appropriately selected depending on the Hc(A) and σs(A), preferably 0 to 5 at. %, since Co is expensive.

As other elements added to the magnetic powder in each of the first magnetic layer and the second magnetic layer, ones conventionally known can be used.

For example, aluminum (Al) has a remarkable effect to improve the acicular finely divided powder in dispersibility (sinter preventing property) and in retention of particle form during reduction. When the Al content of the magnetic powder is less than 0.1 at. %, it is difficult to obtain the above effect. On the other hand, when the Al content of the magnetic powder exceeds 20 at. %, the saturation magnetization σs of the magnetic layer is lowered, so that the magnetic properties deteriorate. Therefore, the Al content of the magnetic powder may be in the range of 0.1 to 20 at. %, preferably 1 to 15 at. %, further preferably 5 to 10 at. %. When Al is contained in the magnetic powder in the form of a compound (oxide), the Al content of the magnetic powder does not mean a content of the Al compound in the magnetic powder but a content of the Al element-contained in the Al compound in the magnetic powder.

Further, like Al, rare earth elements {including yttrium (Y)} effectively improve the metal powder in sinter preventing property and dispersibility. When the rare earth element content of the magnetic powder is less than 0.1 at. %, the effect of the rare earth element is too small and hence the magnetic powder is likely to be sintered. On the other hand, when the rare earth element content of the magnetic powder exceeds 10 at. %, the amount of the oxide of the element is increased and hence the saturation magnetization σs of the magnetic layer becomes too small, so that the magnetic powder is inappropriate as the metal magnetic powder for the second magnetic layer (upper layer). Examples of rare earth elements include Y, La, Ce, Pr, Nd, Sm, Tb, Dy, and Gd, and, when these rare earth elements are used in combination, the content of the sum of the elements in the magnetic powder may be 0.1 to 10 at. %. When the rare earth element is contained in the magnetic powder in the form of a compound, the rare earth element content of the magnetic powder does not mean a content of the compound in the magnetic powder but a content of the rare earth element contained in the compound in the magnetic powder.

Further, in the magnetic recording medium of the present invention, with respect to the particle size of the metal powder used in each of the upper and lower layers, the average major axis length is preferably 0.01 to 0.5 μm, more preferably 0.4 to 0.2 μm. When the average major axis length is less than 0.01 μmm, the metal powder is of superparamagnetism, so that the electromagnetic conversion characteristics markedly deteriorate. On the other hand, when the average major axis length exceeds 0.4 μm, the metal particles have multiple magnetic domains, so that the electromagnetic conversion characteristics deteriorate. Therefore, for securing the magnetic properties suitable for the multilayered magnetic recording medium, the magnetic powder is preferably comprised of acicular fine particles having an average major axis length of 0.01 to 0.4 μm. The smaller the particle size of the magnetic powder, the poorer the dispersibility of the magnetic powder in a magnetic coating composition, and the recording wavelength for the lower layer is longer than that for the upper layer. Therefore, it is desired that the particle size of the magnetic powder used in the lower layer is larger than that of the magnetic powder used in the upper layer.

The metal powder preferably has a specific surface area (BET) of 25 to 70 $m^2/g$, more preferably 40 to 60 $m^2/g$. When the specific surface area of the metal powder is less than 25 $m^2/g$, the compatibility of the metal powder with a resin during the preparation of magnetic tape becomes poor, so that the electromagnetic conversion characteristics deteriorate. On the other hand, when the specific surface area exceeds 70 $m^2/g$, the dispersibility of the metal powder during the preparation of magnetic tape becomes poor, so that the electromagnetic conversion characteristics deteriorate.

The crystallite in the metal magnetic powder preferably has a size of 50 to 250 Å, more preferably 100 to 200 Å. When the crystallite size is less than 50 Å, the magnetic powder is of superparamagnetism, so that the electromagnetic conversion characteristics markedly deteriorate. On the other hand, when the crystallite size exceeds 250 Å, noises increase, so that the electromagnetic conversion characteristics deteriorate. The crystallite in the metal magnetic powder is as follows. The metal magnetic powder is generally in a acicular form, but actually Fe atoms in the metal magnetic powder are bonded together through metallic bounding into a lattice form. Therefore, the magnetic powder is comprised of several to several tens thousand basic lattice-form crystals, and thus the crystallite in the metal magnetic powder means the lattice-form crystal.

In the magnetic recording medium of the present invention, as ingredients mixed into the magnetic layer other than the ferromagnetic powder, e.g., as a binder, an abrasive material, a flame retardant, an anticorrosive agent, a solvent used for preparation of the magnetic coating composition, and the nonmagnetic support, ones conventionally known can be used and there is no particular limitation.

As a material for the nonmagnetic support, ones generally used in magnetic recording media can be used, and examples include polyester, such as polyethylene terephthalate and polyethylene naphthalate; polyolefin, such as polyethylene and polypropylene; cellulose derivatives, such as cellulose triacetate, cellulose diacetate, and cellulose acetate butyrate; vinyl resins, such as polyvinyl chloride and polyvinylidene chloride; other plastics, such as polycarbonate, polyimide, and polyamideimide; metals, such as aluminum and copper; light alloys, such as aluminum alloys and titanium alloys; ceramic; and single crystalline silicon.

As a binder used in the magnetic layer, any materials conventionally known can be used. Examples include vinyl chloride-vinyl acetate copolymers, vinyl chloride-vinyl acetate-vinyl alcohol copolymers, vinyl chloride-vinylidene chloride copolymers, vinyl chloride-acrylonitrile copolymers, vinyl chloride-vinyl acetate-maleic acid copolymers, acrylate-vinylidene chloride copolymers, acrylate-acrylonitrile copolymers, methacrylic acid-vinylidene chloride copolymers, methacrylate-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-methacrylic acid copolymers, polyvinyl butyral, cellulose derivatives, styrene-butadiene copolymers, polyester resins, phenolic resins, epoxy resins, thermosetting polyurethane resins, urea resins, melamine resins, alkyd resins, urea-formaldehyde resins, polyvinyl acetal resins, and mixtures thereof.

Especially desired are polyurethane resins, polyester resins, and acrylonitrile-butadiene copolymers, which are considered to impart flexibility; and cellulose derivatives, phenolic resins, and epoxy resins, which are considered to impart stiffness. These binders may be those which are improved in durability by crosslinking an isocyanate compound or those having an appropriate polar group introduced.

As the carbon black usable in the magnetic recording medium of the present invention, reference can be made to, for example, "Kabon-burakku Binran (Carbon Black Handbook)" (edited by the Society of Carbon Black, published by TOSHO SHUPPAN-SHA CO., LTD. on May 25, 1971), and, with respect to the type of carbon, there is no particular limitation.

As the carbon black used in the present invention, one having a DBP oil absorption of 30 to 150 ml/100 g, preferably 50 to 150 to ml/100 g, an average particle size of 5 to 150 nm, preferably 15 to 50 nm, and a specific surface area of 40 to 300 $m^2/g$, preferably 100 to 250 $m^2/g$, as measured by a BET method, is effective. Further, the carbon black preferably has a tap density of 0.1 to 1 g/cc and pH of 2.0 to 10. When the carbon black has a larger DBP oil absorption, the viscosity of the resultant composition is too high, so that the dispersibility becomes markedly poor. On the other hand, when the carbon black has a smaller DBP oil absorption, the dispersibility is very poor and hence the dispersing step takes much time. When the carbon black has a smaller average particle size, the dispersion time is prolonged, but the surface properties are excellent. When the carbon black has a larger average particle size, the surface properties are poor. Therefore, it is preferred that the carbon black has an average particle size which falls within the above-mentioned range.

Examples of carbon black having the above-mentioned properties include trade names RAVEN 1250, manufactured and sold by Columbia Carbon Corporation (particle size: 23 nm; BET value: 135.0 $m^2/g$; DBP oil absorption: 58.0 ml/100 g), RAVEN 1255 (particle size: 23 nm; BET value: 125.0 $m^2/g$; DBP oil absorption: 58.0 ml/100 g), RAVEN 1020 (particle size: 27 nm; BET value: 95.0 $m^2/g$; DBP oil absorption: 60.0 ml/100 g), RAVEN 1080 (particle size: 28 nm; BET value: 78.0 $m^2/g$; DBP oil absorption: 65.0 ml/100 g), RAVEN 1035, RAVEN 1040, RAVEN 1060, RAVEN 3300, RAVEN 450, and RAVEN 780; and trade name SC, manufactured and sold by CONDUCTEX (particle size: 20 nm; BET value: 220.0 $m^2/g$; DBP oil absorption: 115.0 ml/100 g).

In addition, trade name #80, manufactured and sold by Asahi Carbon Co., Ltd. (particle size: 23 nm; BET value: 117.0 $m^2/g$; DBP oil absorption: 113.0 ml/100 g); trade names #22B, manufactured and sold by Mitsubishi Chemical Industries Ltd. (particle size: 40 nm; BET value: 5.0 $m^2/g$; DBP oil absorption: 131.0 ml/100 g), and #20B (particle size: 40 nm; BET value: 56.0 $m^2/g$; DBP oil absorption: 115.0 ml/100 g); and trade names BLACK PEARLS L, manufactured and sold by Cabot Specialty Chemicals Inc. (particle size: 24 nm; BET value: 250.0 $m^2/g$; DBP oil absorption: 60.0 ml/100 g), BLACK PEARLS 800 (particle size: 17.0 nm; BET value: 240.0 $m^2/g$; DBP oil absorption: 75.0 ml/100 g), BLACK PEARLS 1000, BLACK PEARLS 1100, BLACK PEARLS 700, and BLACK PEARLS 905, may be used. Further, as carbon having a larger particle size, MT CARBON (manufactured and sold by Columbia Carbon Corporation; particle size: 350 nm), and Thermax MT can be used.

As the abrasive material, for example, α-alumina having an α rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, or acicular α-iron oxide obtained by dehydrating and annealing a material of magnetic iron oxide, and these materials, if desired, having a surface treated with aluminum and/or silica may be used individually or in combination.

The above nonmagnetic powder generally has a particle size in the range of 0.01 to 2 μm, preferably 0.015 to 1.00 μm, further preferably 0.015 to 0.50 μm. If desired, the same effect can be obtained by using nonmagnetic powder having different particle sizes in combination or using solely nonmagnetic powder having a broad particle size distribution. The nonmagnetic powder generally has a tap density of 0.05 to 2 g/cc, preferably 0.2 to 1.5 g/cc. The nonmagnetic powder generally has a specific surface area of 1 to 200 $m^2/g$, desirably 5 to 100 $m^2/g$, further desirably 7 to 80 $m^2/g$. The nonmagnetic powder generally has a crystallite size in the range of 0.01 to 2 μm, preferably 0.015 to 1.00 μm, further preferably 0.015 to 0.50 μm. The nonmagnetic powder generally has an oil absorption of 5 to 100 ml/100 g, desirably 10 to 80 ml/100 g, further desirably 20 to 60 ml/100 g, as measured using DBP. The nonmagnetic powder generally has a specific gravity of 1 to 12, preferably 2 to 8. The nonmagnetic powder may be any forms of an acicular form, a sphere form, a cube form, and a plate form.

The nonmagnetic powder may not have a purity of 100% and, if desired, the nonmagnetic powder may have a surface treated with a compound. In this case, generally, the effect of the nonmagnetic powder is not sacrificed as long as the nonmagnetic powder has a purity of 70% or more. For example, when titanium oxide is used as the nonmagnetic powder, one having a surface treated with alumina is generally used. It is desired that the ignition loss is 20% or less. It is desired that the inorganic powder used in the present invention has a Mohs hardness of 6 or more.

Further, as the abrasive material, conventionally known materials having a Mohs hardness of 6 or more comprised mainly of, for example, α-alumina, β-alumina, fusion alumina, or titanium oxide may be used individually or in combination.

Specific examples of abrasive materials used in the present invention include trade names UA5600 and UA5605, manufactured and sold by SHOWA DENKO K.K.; trade names AKP-20, AKP-30, AKP-50, HIT-50, HIT-100, and ZA-G1, manufactured and sold by Sumitomo Chemical Co., Ltd.; trade names G5, G7, and S-1, manufactured and sold by Nippon Chemical Industrial CO., LTD.; trade names TF-100, TF-120, TF-140, DPN 250BX, and DBN 270BX, manufactured and sold by TODA KOGYO CORP.; trade names TTO-51B, TTO-55A, TTO-55B, TTO-55C, TTO-55S, TTO-55D, FT-1000, FT-2000, FTL-100, FTL-200, M-1, S-1, and SN-100, manufactured and sold by Ishihara Sangyo Kaisha Ltd.; trade names ECT-52, STT-4D, STT-30D, STT-30, and STT-65C, manufactured and sold by TITAN KOGYO KABUSHIKI KAISHA; trade name T-1, manufactured and sold by MITSUBISHI MATERIALS CORPORATION; trade names NS-O, NS-3Y, and NS-8Y, manufactured and sold by NIPPON SHOKUBAI CO., LTD.; trade names MT-100S, MT-100T, MT-150W, MT-500B, MT-600B, and MT-100F, manufactured and sold by TAYCA CORPORATION; trade names FINE X-25, BF-1, BF-10, BF-20, BF-1L, and BF-10P, manufactured and sold by SAKAI CHEMICAL INDUSTRY CO., LTD.; trade names DEFIC-Y and DEFIC-R, manufactured and sold by Dowa Mining Co., Ltd.; and trade name Y-LOP, manufactured and sold by TITAN KOGYO KABUSHIKI KAISHA.

As the lubricant, any lubricants conventionally known can be used. For example, higher fatty acid ester, silicone oil, fatty acid-modified silicone, fluorine-containing silicone and other fluorine lubricants, polyolefin, polyglycol, ester and metal salts of alkylphosphoric acid, polyphenyl ether, fluoroalkyl ether, amine lubricants, such as amine salts of alkylcarboxylic acid and amine salts of fluoroalkylcarboxylic acid, alcohol having 12 to 24 carbon atoms (which may be unsaturated or branched), and higher fatty acid having 12 to 24 carbon atoms can be used.

The higher fatty acid ester component may be higher fatty acid ester having 12 to 32 carbon atoms (which may be unsaturated or branched), and examples include methyl esters, ethyl esters, propyl esters, isopropyl esters, butyl esters, pentyl esters, hexyl esters, heptyl esters, and octyl esters of lauric acid, myristic acid, palmitic acid, stearic acid, isostearic acid, arachic acid, oleic acid, eicosanoic acid, elaidic acid, behenic acid, linoleic acid, and linolenic acid.

Specific examples of compounds include butyl stearate, pentyl stearate, heptyl stearate, octyl stearate, isooctyl stearate, butoxyethyl stearate, octyl myristate, isooctyl myristate, and butyl palmitate. A plurality of lubricants may be mixed together.

As the flame retardant, in addition to the above-mentioned carbon black, conventionally known flame retardants including natural surfactants, nonionic surfactants, and cationic surfactants can be used.

In the present invention, coupling agents conventionally known can be used. Examples of coupling agents include silane coupling agents, titanate coupling agents, and aluminum coupling agents. The amount of the coupling agent added is preferably 0.05 to 10.00 parts by weight, more preferably 0.1 to 5.00 parts by weight, relative to 100 parts by weight of the magnetic powder.

Examples of silane coupling agents which can be preferably used include vinylsilane compounds, such as γ-methacryloxypropyltrimethoxysilane and vinyltriethoxysilane; epoxysilane compounds, such as β-(3,4-epoxycyclohexyl)ethyltrimethoxysilane and γ-glycidoxypropyltrimethoxysilane; aminosilane compounds, such as γ-aminopropyltriethoxysilane and N-β (aminoethyl)γ-aminopropylmethyldimethoxysilane; and mercaptosilane compounds, such as γ-mercaptopropyltrimethoxysilane.

Examples of titanate coupling agents include
tetra-n-butoxytitanium, tetraisopropoxytitanium,
bis[2-{(2-aminoethyl)amino}ethanolate][2-{(2-aminoethyl)amino}ethanolate-0](2-propanolate)titanium,
tris(isooctadecanoate-0)(2-propanolate)titanium,
bis(ditridecylphosphite-0")tetrakis(2-propanolate)dihydrozenetitanate,
bis(dioctylphosphite-0")tetrakis(2-propanolate)dihydrozenetitanate,
tris(dioctylphosphite-0")(2-propanolate)titanium, bis(dioctylphosphite-0")[1,2-ethanediolate(2-)-0,0"]titanium,
tris(dodecylbenzenesulfonate-0)(2-propanolate)titanium, and
tetrakis[2,2-bis{(2-propenyloxy)methyl}-1-butanolate]titanate.

Specific examples of trade names of titanate coupling agents which can be preferably used include PLENACT KR TTS, KR 46B, KR 55, KR 41B, KR 38S, KR 138S, KR 238S, 338X, KR 12, KR 44, KR 9SA, and KR 34S, manufactured and sold by Ajinomoto-Fine-Techno Co., Inc.

Examples of aluminum coupling agents include acetoalkoxyaluminum diisopropylate, and specific examples of trade names of aluminum coupling agents which can be preferably used include PLENACT AL-M, manufactured and sold by Ajinomoto-Fine-Techno Co., Inc.

In the present invention, for imparting more excellent durability to the magnetic recording medium, an isocyanate curing agent having an average functional group number of 2 or more may be added. Specifically, in the present invention, polymeric substances of polyisocyanate and adducts of polyisocyanate with polyol can be preferably used. Of these, isocyanurate having a cyclic skeleton, which is a trimer of diisocyanate, is a curing agent having remarkable reactivity and effective to improve the durability.

Examples of isocyanate curing agents include aromatic polyisocyanate and aliphatic polyisocyanate, and preferred are adducts of the polyisocyanate with an active hydrogen compound.

Examples of aromatic polyisocyanate include toluene diisocyanate (TDI), 1,3-xylene diisocyanate, 1,4-xylene diisocyanate, 4,4'-diphenylmethane diisocyanate (MDI), p-phenyl diisocyanate, m-phenyl diisocyanate, and 1,5-naphthyl diisocyanate.

Examples of aliphatic polyisocyanate include hexamethylene diisocyanate (HDI), dicyclohexylmethane diisocyanate, cyclohexane diisocyanate, and isophorone diisocyanate (IPDI).

Examples of active hydrogen compounds which form an adduct, together with the above polyisocyanate, include ethylene glycol, 1,4-butanediol, 1,3-butanediol, neopentyl glycol, diethylene glycol, trimethyrol propane, and glycerol, and preferred are those having an average molecular weight of 100 to 5,000.

The amount of the curing agent added is generally 0 to 20 parts by weight, preferably 0 to 10 parts by weight, relative to the weight of the binder resin. Theoretically, the weight of the curing agent containing isocyanate in an amount corresponding to the equivalent amount of the active hydrogen contained in the polyurethane resin composition (or binder resin composition) is satisfactory. However, in the actual production, isocyanate in the curing agent is lost due to the reaction with water, and hence isocyanate in an amount corresponding to the equivalent amount of the active hydrogen is usually unsatisfactory. For this reason, it is effective to add an excess curing agent in an amount 10 to 50% larger than the equivalent amount of the active hydrogen.

When a curing agent comprised of polyisocyanate is used in the magnetic coating composition, the magnetic coating composition is applied, and then a curing reaction is promoted at 40 to 80° C. for several hours, thus obtaining larger binding strength.

Examples of solvents which can be used for preparation of the magnetic coating composition include ketone solvents, such as acetone, methyl ethyl ketone, methyl isobutyl ketone, and cyclohexanone; ester solvents, such as methyl acetate, ethyl acetate, butyl acetate, ethyl lactate, and ethyl acetate monoethyl ether; glycol ether solvents, such as glycol monoethyl ether and dioxane; aromatic hydrocarbon solvents, such as benzene, toluene, and xylene; and chlorine-containing solvents, such as methylene chloride, ethylene chloride, carbon tetrachloride, chloroform, ethylene chlorohydrin, and dichlorobenzene. Other organic solvents conventionally known can be used.

As a method for preparing the magnetic coating composition, any methods conventionally known can be used. For example, a roll mill, a ball mill, a sand mill, a trone mill, a high-speed stone mill, a basket mill, a disper, a homomixer, a kneader, a continuous kneader, an extruder, a homogenizer, and an ultrasonic dispersing machine can be used.

In the magnetic recording medium of the present invention, a nonmagnetic back coat layer may be formed on another surface of the nonmagnetic support that is not the surface on which the magnetic layers are formed. The back coat layer may have a thickness of 0.3 to 1.0 µm, and conventionally known materials for the back coat layer can be used.

Prior to application of the magnetic coating composition directly onto the nonmagnetic support, an undercoat layer, such as an adhesive layer, may be applied to the nonmagnetic support, or the nonmagnetic support may be subjected to pretreatment, such as a corona discharge treatment or an electron beam radiation treatment.

Examples of methods for applying the magnetic coating composition to the nonmagnetic support include air doctor coating, blade coating, rod coating, extrusion coating, air knife coating, squeeze coating, impregnation coating, reverse roll coating, gravure coating, transfer roll coating, and cast coating. Other methods can be used, and further co-extrusion multilayer coating may be used.

If desired, for improving the binding strength and the like, a layer (undercoat layer) comprised mainly of the binder conventionally known may be formed between the nonmagnetic support and the first magnetic layer (lower layer).

EXAMPLES

Hereinbelow, the present invention will be described in more detail with reference to the following Examples, which should not be construed as limiting the scope of the present invention.

Formation of Magnetic Layer:
Coating compositions having the formulations shown below for individual magnetic layers were individually prepared.
Preparation of Magnetic Coating Composition for Upper Layer:
Metal magnetic powder: 100 Parts by weight
Average major axis length: 0.01 to 0.5 µm
Specific surface area: 50 to 70 $m^2/g$ as measured by BET method
Crystallite size: 50 to 250 Å
Coercive force Hc: 100 to 200 (kA/m)
Saturation magnetization σs: 100 to 200 ($Am^2/kg$)
{Details are shown in FIGS. 15 to 18 (Tables 1 to 4).}
Vinyl chloride copolymer: 15 Parts by weight
(trade name: MR-110; manufactured and sold by Nippon Zeon Co., Ltd.)
Polyester polyurethane resin: 5 Parts by weight
(isophthalic acid/terephthalic acid/butanediol-MDI polyurethane; molecular weight: 25,000; polar group $SO_3Na$ content: 0.2 wt %)

α-Al$_2$O$_3$: 10 Parts by weight
(trade name: HIT-5010; manufactured and sold by Sumitomo Chemical Co., Ltd.)
Carbon black: 1 Part by weight
(trade name: BP-L; manufactured and sold by Cabot Specialty Chemicals Inc.)
Polyisocyanate: 4 Parts by weight
(trade name: CORONATE L; manufactured and sold by NIPPON POLYURETHANE INDUSTRY CO., LTD.; Polyisocyanate was added immediately before coating.)
Myristic acid: 1 Part by weight
Butyl stearate: 1 Part by weight
Methyl ethyl ketone: 80 Parts by weight
Methyl isobutyl ketone: 80 Parts by weight
Toluene: 80 Parts by weight A magnetic mixture having the above formulation for upper layer coating composition was kneaded by means of a three-roll, and then dispersed using a sand mill, and 4 parts by weight of polyisocyanate and 1 part by weight of myristic acid were added to the resultant dispersion and filtered by means of a filter having an average pore diameter of 1 μm to prepare a magnetic coating composition for upper layer.

Preparation of Magnetic Coating Composition for Lower Layer:
Metal magnetic powder: 100 Parts by weight
Average major axis length: 0.01 to 0.5 μm
Specific surface area: 25 to 60 m$^2$/g as measured by BET method
Crystallite size: 50 to 250 Å
Coercive force Hc: 90 to 180 (kA/m)
Saturation magnetization σs: 80 to 150 (Am$^2$/kg)
{Details are shown in FIGS. 15 to 18 (Tables 1 to 4).}
Vinyl chloride copolymer: 15 Parts by weight
(tradename: MR-110; manufactured and sold by Nippon Zeon Co., Ltd.)
Polyester polyurethane resin: 5 Parts by weight
(isophthalic acid/terephthalic acid/butanediol-MDI polyurethane; molecular weight: 25,000; polar group SO$_3$Na content: 0.2 wt %)
Carbon black: 5 Parts by weight
(trade name: BP-L; manufactured and sold by Cabot Specialty Chemicals Inc.)
Polyisocyanate: 4 Parts by weight
(trade name: CORONATE L; manufactured and sold by NIPPON POLYURETHANE INDUSTRY CO., LTD.; Polyisocyanate was added immediately before coating.)
Myristic acid: 1 Part by weight
Butyl stearate: 1 Part by weight
Methyl ethyl ketone: 80 Parts by weight
Methyl isobutyl ketone: 80 Parts by weight
Toluene: 80 Parts by weight A magnetic mixture having the above formulation for lower layer coating composition was kneaded by means of a continuous kneader, and then dispersed using a sand mill, and 4 parts by weight of polyisocyanate and 1 part by weight of myristic acid were added to the resultant dispersion and filtered by means of a filter having an average pore diameter of 1 μm to prepare a magnetic coating composition for lower layer.

A back coat coating composition having the formulation shown below was prepared.

Preparation of Nonmagnetic Coating Composition for Back Coat:
Carbon black: 100 Parts by weight
(average particle size: 20 nm)
Carbon black: 5 Parts by weight
(average particle size: 350 nm)
Polyurethane resin: 25 Parts by weight
(polycarbonate polyol/neopentyl glycol HDI polyurethane; molecular weight: 35,000; N-methyldiethanolamine content: 0.2 wt %)
Nitrocellulose: 15 Parts by weight
(tradename: NC-1/2H; manufactured and sold by Asahi Kasei Corporation)
Polyisocyanate: 20 Parts by weight
(trade name: CORONATE L; manufactured and sold by NIPPON POLYURETHANE INDUSTRY CO., LTD.; Polyisocyanate was added immediately before coating.)
Methyl ethyl ketone: 180 Parts by weight
Methyl isobutyl ketone: 180 Parts by weight
Toluene: 180 Parts by weight A mixture having the above formulation for nonmagnetic coating composition was kneaded by means of a three-roll, and then dispersed using a sand mill, and 20 parts by weight of polyisocyanate was added to the resultant dispersion and filtered by means of a filter having an average pore diameter of 1 μm to prepare a nonmagnetic coating composition for back coat.

The previously prepared magnetic coating compositions were applied to a polyethylene terephthalate film having a thickness of 10 μm so that the thickness of the resultant individual magnetic layers became 4.0 μm to form two magnetic layers simultaneously, and then dried and calendered, followed by curing. Then, the above-prepared nonmagnetic coating composition for back coat was applied to another surface of the polyethylene terephthalate film, that is not the surface on which the magnetic layers were formed, so that the thickness of the resultant back coat layer became 0.8 μm, and then dried. The resultant wide magnetic film was cut into ½ inch in width to form a video tape. Further, the video tapes formed were individually incorporated into HDCAM cassettes, manufactured and sold by Sony Corporation, to obtain cassette tapes in Examples 1 to 8 and Comparative Examples 1 to 14.

Measurement Method:
(Measurement of Electromagnetic Conversion Characteristics)

With respect to each of the samples incorporated into HDCAM cassettes, an output was individually measured using a digital video signal at 46.98 MHz and analog audio signals at 1 kHz and 12 kHz by means of HDCAM video recorder (HDW-500), manufactured and sold by Sony Corporation, taking as 0 dB the output of HDCAM video tape (BCT-124HDL), manufactured and sold by Sony Corporation. (The output was measured in the same manner.) In FIGS. 17 and 18 (Tables 3 and 4), the outputs in Example 6 and Example 8, respectively, were taken as 0 dB. Further, the analog audio frequency characteristic (F characteristic) was determined by subtracting the output at 12 kHz from the output at 1 kHz. (The F characteristic was determined in the same manner.)

In the measurement of the electromagnetic conversion characteristics, it is considered that a sample having an output lower than the output of the control tape by 0.5 dB or more has poor properties, and that a sample having an output lower than the output of the control tape by 1.0 dB or more cannot meet the standards in various formats. In the measurement of the analog audio frequency characteristic, it is considered that a sample having a measurement value of −1.5 to 1.5 dB is excellent and has no problem for use.

(Measurement of Durability)

100-Hour recording and reproducing were conducted by means of HDCAM video recorder (HDW-500), manufactured and sold by Sony Corporation, to measure the output waveform of the video signals, and the durability was evaluated in accordance with the following criteria:

○: No deterioration occurred in the output of the video signals.

Δ: The output deteriorated and then recovered, or the lowering of the output was 2.0 dB or less.

X: Head clogging occurred.

(Measurement of Weathering Resistance)

The tapes in the Examples and Comparative Examples were individually stored in an environment at a temperature of 45° C. at a humidity of 80% for one month, and reduction $\Delta\Phi$ of the residual magnetic flux of each tape between before and after the storage was measured, and the weathering resistance was evaluated in accordance with the following criteria:

○: $\Delta\Phi$ was −5% or less.

Δ: $\Delta\Phi$ was −5 to −10%.

X: $\Delta\Phi$ was −10% or more.

The results are shown in FIGS. 19 to 22 (Tables 5 to 8).

As can be seen from FIG. 19 (Table 5), in Comparative Example 1 in which the lower layer having a thickness of 3 μm was solely formed as a magnetic layer, the output of digital signals was very low. In addition, the Co content of the magnetic layer was too small, and hence both the durability and the weathering resistance were poor.

Further, in Comparative Example 2 in which the upper layer having a thickness of 3 μm was solely formed as a magnetic layer, the output of analog audio signals was very low.

In Examples 1 to 3 and Comparative Examples 3 to 6 in which the upper layer and lower layer had different thickness, when the thickness of the upper layer was less than 0.01 μm (Comparative Examples 3 and 4), the coating layer had a problem of discontinuity (a defect was caused in the coating layer), so that the output of digital signals was an unstable and considerably low value. In addition, in Comparative Examples 5 and 6 in which the thickness of the upper layer exceeded 0.5 μm, the digital output was likely to be lowered due to the thickness demagnetization. Further, when the thickness of the lower layer was less than 1.0 μm (Comparative Examples 3 and 5), satisfactory analog audio properties could not be obtained.

Figure 4:
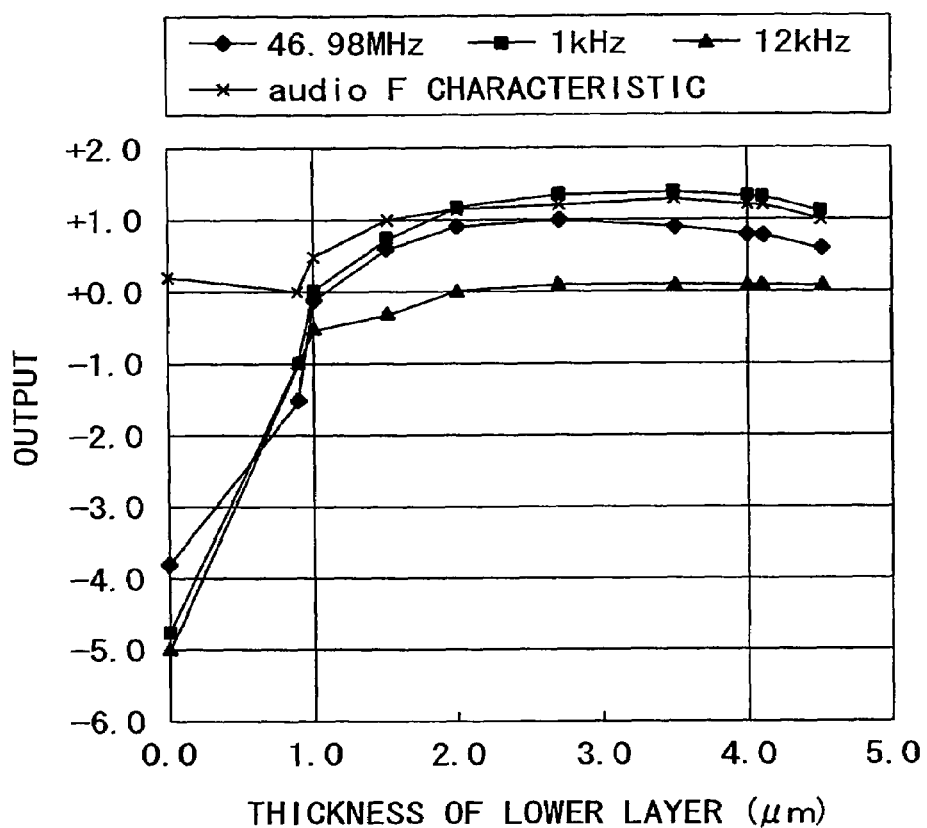
FIG. 4 is a graph showing the electromagnetic conversion characteristics in the Example of the present invention when the thickness of the upper layer was fixed at 0.3 μm and the thickness of the lower layer was changed.

FIG. 4 is a graph showing the electromagnetic conversion characteristics when, as shown in FIG. 23 (Table 9), the thickness of the upper layer was fixed at 0.3 μm, the σs(B) and Hc(B) of the upper layer magnetic powder were fixed at 135 Am²/kg and 135 kA/m, respectively, the Co content of the upper layer magnetic powder was fixed at 10 at. %, the σs(A) and Hc(A) of the lower layer magnetic powder were fixed at 120 Am²/kg and 115 kA/m, respectively, the Co content of the lower layer magnetic powder was fixed at 3 at. %, and only the thickness of the lower layer was changed. The results are shown also in FIG. 24 (Table 10).

As can be seen from FIG. 4 and FIG. 24 (Table 10), when the thickness of the lower layer is less than 1 μm, satisfactory analog audio electromagnetic conversion characteristics cannot be obtained due to the too small thickness. Further, it is apparent that, when the thickness of the lower layer exceeds 4 μm, the electromagnetic conversion characteristics are saturated and self demagnetization occurs due to the too large thickness of the magnetic layer. Thus, when the thickness of the lower layer falls in a specific range, i.e., the range of from 1 to 4 μm, the electromagnetic conversion characteristics of analog signals can be improved.

Figure 5:
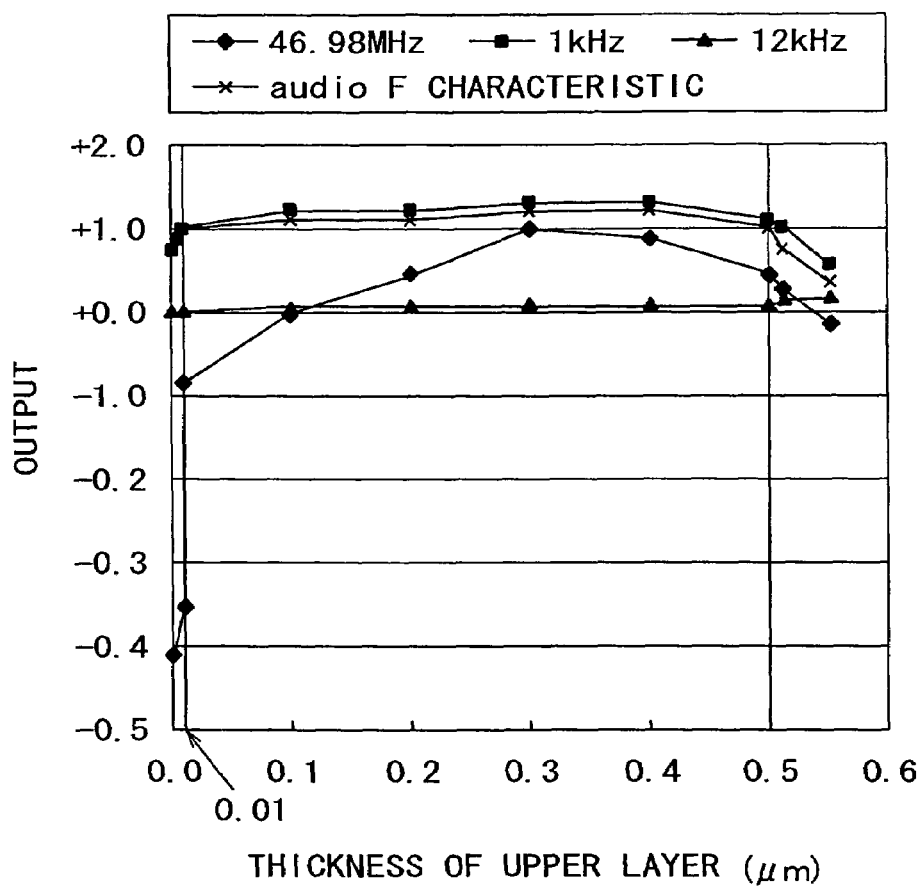
FIG. 5 is a graph showing the electromagnetic conversion characteristics in the Example of the present invention when the thickness of the lower layer was fixed at 2.7 μm and the thickness of the upper layer was changed.

FIG. 5 is a graph showing the electromagnetic conversion characteristics when, as shown in FIG. 25 (Table 11), the thickness of the lower layer was fixed at 2.7 μm, the σs(B) and Hc(B) of the upper layer magnetic powder were fixed at 135 Am²/kg and 135 kA/m, respectively, the Co content of the upper layer magnetic powder was fixed at 10 at. %, the σs(A) and Hc(A) of the lower layer magnetic powder were fixed at 120 Am²/kg and 115 kA/m, respectively, the Co content of the lower layer magnetic powder was fixed at 3 at. %, and only the thickness of the upper layer was changed. The results are shown also in FIG. 26 (Table 12).

As can be seen from FIG. 5 and FIG. 26 (Table 12), when the thickness of the upper layer is less than 0.01 μm, the coating layer had a problem of discontinuity (a defect was caused in the coating layer), so that the output of digital signals is an unstable and considerably low value. Further, it is apparent that, when the thickness of the upper layer exceeds 0.5 μm, the digital output is likely to be lowered due to the thickness demagnetization. Thus, when the thickness of the upper layer falls in a specific range, i.e., the range of from 0.01 to 0.5 μm, the electromagnetic conversion characteristics of digital signals can be improved.

As can be seen from FIG. 20 (Table 6), in Example 4 in which the relationship: Hc(A)/Hc(B)≦1.0 was satisfied, excellent measurement values could be obtained in respect of all the video and analog audio outputs and the frequency characteristic. However, in Example 4 in which the relationship: Hc(A)/Hc(B)≧0.9 was satisfied, the output of digital signals was slightly low due to the lower layer having the above relationship, as compared to the output in Example 2. Thus, it is important that the upper and lower layers satisfy the relationship: Hc(A)/Hc(B)≦1.0, especially, more preferably the relationship: Hc(A)/Hc(B)≦0.9.

By contrast, in Comparative Example 7 in which the σs(A) of the lower layer was higher than the σs(B) of the upper layer and the relationship: σs(A)/σs(B)≦1.0 was not satisfied, the output was low, as compared to the output in Example 2. Thus, with respect to the saturation magnetization σs, it is important that the upper layer (B) and the lower layer (A) satisfy the relationship: σs(A)/σs(B)≦1.0.

FIG. 21 (Table 7) shows the results obtained when the upper layer had σs(B) and Hc(B) upper limits of 200 Am²/kg and 200 kA/m, respectively, and this upper layer was combined with various lower layers.

As can be seen from FIG. 21 (Table 7), in Comparative Example 8 in which the σs of the lower layer was less than 80 Am²/kg and the Hc of the lower layer was less than 90 kA/m, the analog audio output was low, as compared to the output in Example 6. Further, in Comparative Example 9 in which the σs of the lower layer exceeded 150 Am²/kg and the Hc exceeded 180 kA/m, the analog audio output was low like in Comparative Example 8.

In Comparative Example 10, the lower layer had σs(A) and Hc(A) lower limits of 80 Am²/kg and 90 kA/m, respectively, the upper layer had a large Co content (higher than 50 at. %), the σs(B) of the upper layer exceeded 200 Am²/kg, and the Hc(B) of the upper layer exceeded 50 kA/m. Further, in Comparative Example 11, the lower layer had σs(A) and Hc(A) upper limits of 150 Am²/kg and 180 kA/m, respectively, the upper layer had a large Co content (higher than 50 at. %), the σs(B) of the upper layer exceeded 200 Am²/kg, and the Hc(B) of the upper layer exceeded 50 kA/m.

In Comparative Examples 10 and 11, the upper layer had σs and Hc which exceeded the respective upper limits defined in the present invention. Therefore, the effect of the cohesion of the magnetic powder was too large, and hence the analog audio output was low, as compared to the output in Examples 5 and 7.

FIG. 22 (Table 8) shows the results obtained when the upper layer had σs(B) and Hc(B) lower limits of 100 Am²/kg or less and 100 kA/m or less, respectively, and this upper layer was combined with various lower layers.

In Comparative Examples 12 and 13, the lower layer had σs(A) and Hc(A) which fell in the respective ranges defined in the present invention, but the σs(B) and Hc(B) of the upper layer were too small, the output of digital signals was very low. In addition, in Comparative Example 14 in which the σs of the lower layer was also too small, a high analog audio output could not be obtained.

Figure 6:
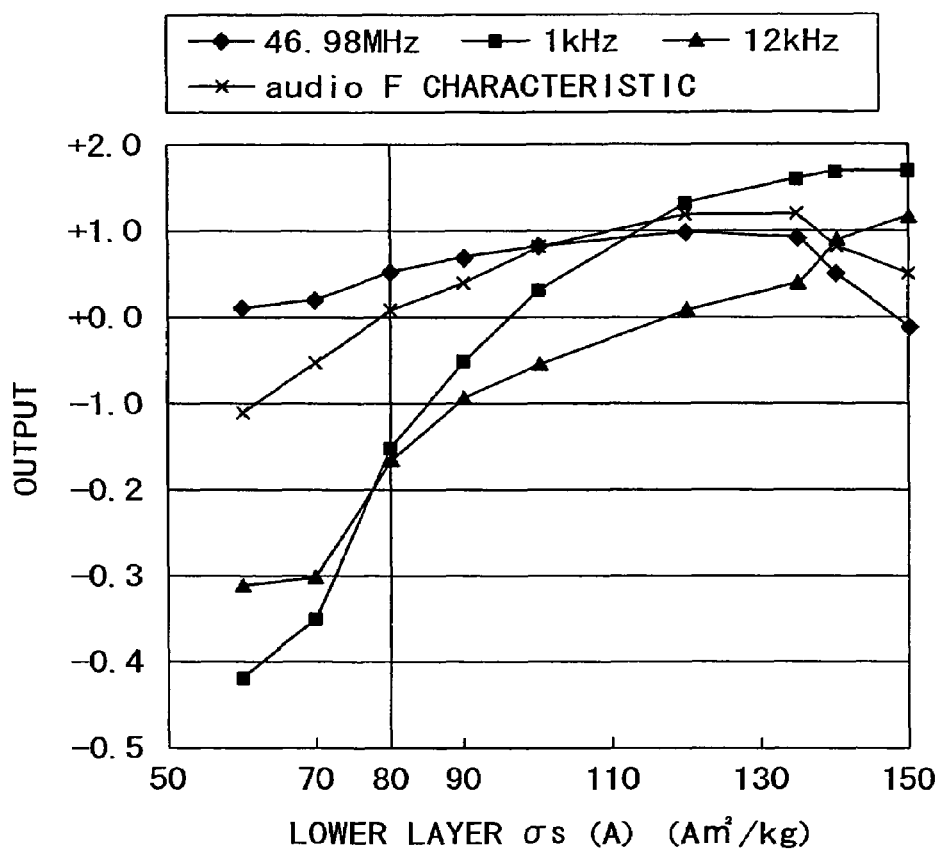
FIG. 6 is a graph showing the electromagnetic conversion characteristics in the Example of the present invention when the values other than the saturation magnetization σs(A) of the lower layer were fixed and the σs(A) was changed.

FIG. 6 is a graph showing the electromagnetic conversion characteristics when, as shown in FIG. 27 (Table 13), the Hc(A) of the lower layer was fixed at 115 kA/m, the σs(B) and Hc(B) of the upper layer were fixed at 135 Am²/kg and 135 kA/m, respectively, the thickness of the lower layer was fixed at 2.7 μm, the thickness of the upper layer was fixed at 0.3 μm, and the σs(A) of the lower layer was changed. The results are shown also in FIG. 28 (Table 14).

As can be seen from FIG. 6 and FIG. 28 (Table 14), when the σs(A) of the lower layer was less than 80 Am²/kg, excellent electromagnetic conversion characteristics of analog signals could not be secured. Further, when the σs(A) of the lower layer exceeded 150 Am²/kg, the effect of the demagnetization was large, so that the electromagnetic conversion characteristics of analog signals deteriorated.

As is apparent from the above, it is important that the σs(A) of the lower layer is 80 to 150 Am²/kg. When the σs(A) of the lower layer falls in this range, the electromagnetic conversion characteristics of analog signals can be improved.

Figure 7:
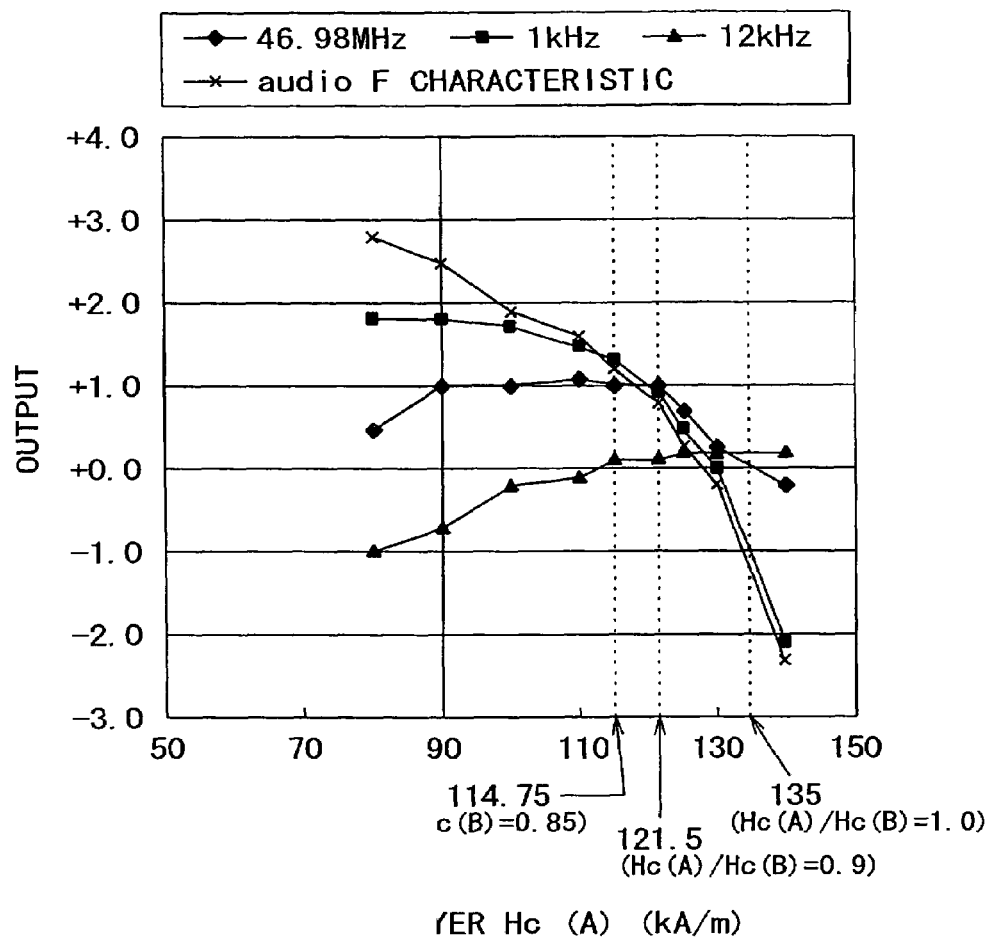
FIG. 7 is a graph showing the electromagnetic conversion characteristics in the Example of the present invention when the values other than the coercive force Hc(A) of the lower layer were fixed and the Hc(A) was changed.

FIG. 7 is a graph showing the electromagnetic conversion characteristics when, as shown in FIG. 29 (Table 15), the σs(A) of the lower layer was fixed at 120 Am²/kg, the σs(B) and Hc(B) of the upper layer were fixed at 135 Am²/kg and 135 kA/m, respectively, the thickness of the lower layer was fixed at 2.7 μm, the thickness of the upper layer was fixed at 0.3 μm, and the Hc(A) of the lower layer was changed. The results are shown also in FIG. 30 (Table 16).

As can be seen from FIG. 7 and FIG. 30 (Table 16), when the Hc(A) of the lower layer is less than 90 kA/m, the output of digital signals is lowered. In addition, the above Hc(A) is too small for the lower layer magnetic powder having a σs of 120 Am²/kg, and therefore the magnetic powder has markedly poor stability and hence has poor weathering resistance. Further, when the Hc(A) of the lower layer is 110 kA/m, namely, less than 114.75 kA/m {less than 85% of the Hc(B) of the upper layer}, the output at a frequency as low as 1 kHz is increased, but the output at a frequency as high as 12 kHz is lowered, and the frequency characteristic tends to deteriorate. From the above, it is found that the more preferred range of the Hc(A) of the lower layer for the frequency characteristic is 85 to 100%, further preferably 85 to 90% of the Hc(B) of the upper layer.

As is apparent from the above, it is important that the Hc(A) of the lower layer is 90 to 180 kA/m and that the upper and lower layers satisfy the relationship: Hc(A)/Hc(B)≦1.0, more preferably 0.85≦Hc(A)/Hc(B)≦1.0, further preferably 0.85≦Hc(A)/Hc(B)≦0.9. When the Hc(A) and Hc(B) fall in the above range, the electromagnetic conversion characteristics of analog signals can be improved.

Figure 8:
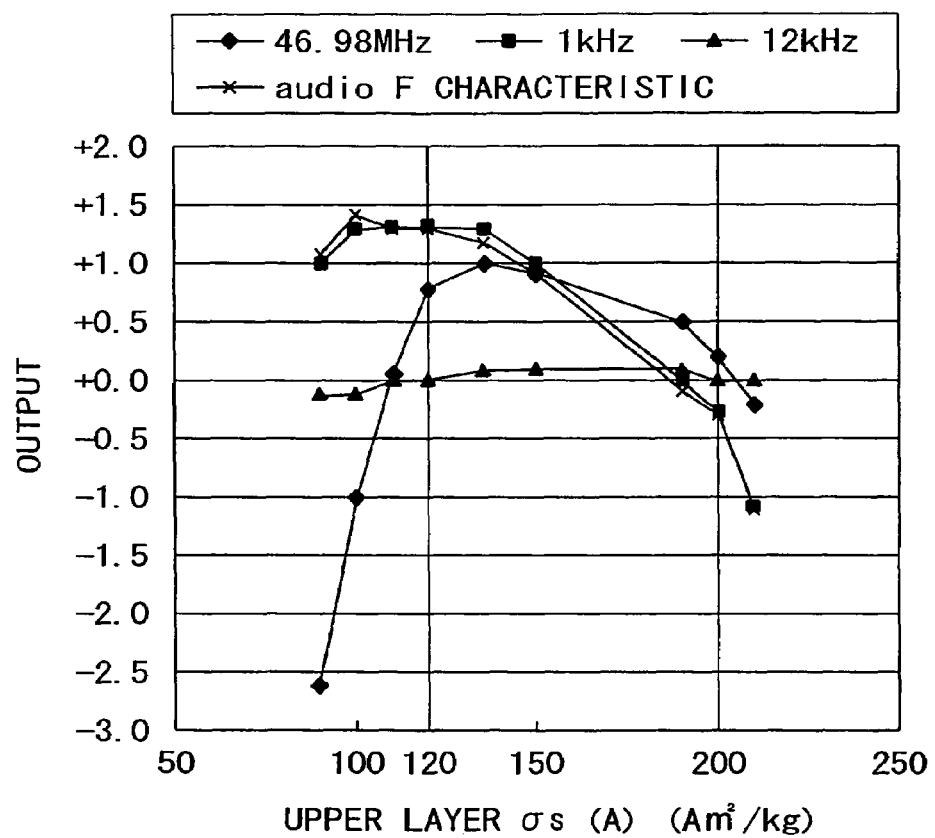
FIG. 8 is a graph showing the electromagnetic conversion characteristics in the Example of the present invention when the values other than the saturation magnetization σs(B) of the upper layer were fixed and the σs(B) was changed.

FIG. 8 is a graph showing the electromagnetic conversion characteristics when, as shown in FIG. 31 (Table 17), the σs(A) and Hc(A) of the lower layer were fixed at 120 Am²/kg and 115 kA/m, respectively, the Hc(B) of the upper layer was fixed at 135 kA/m, the thickness of the lower layer was fixed at 2.7 μm, the thickness of the upper layer was fixed at 0.3 μm, and the σs(B) of the upper layer was changed. The results are shown also in FIG. 32 (Table 18).

As can be seen from FIG. 8 and FIG. 32 (Table 18), when the σs(B) of the upper layer is lower than the σs(A) of the lower layer, the output of digital signals becomes markedly poor. Further, it is apparent that, when the σs(B) of the upper layer exceeds 200 Am²/kg, the dispersibility in the magnetic coating composition deteriorates and the composition is unsuitable for formation of a thin film, so that both the digital output and the analog output are lowered.

As is apparent from the above, it is important that the σs(B) of the upper layer is 100 to 200 Am²/kg, especially preferably equal to or higher than the σs(A) of the lower layer. When the σs(B) falls in this range, the electromagnetic conversion characteristics of digital signals can be improved.

Figure 9:
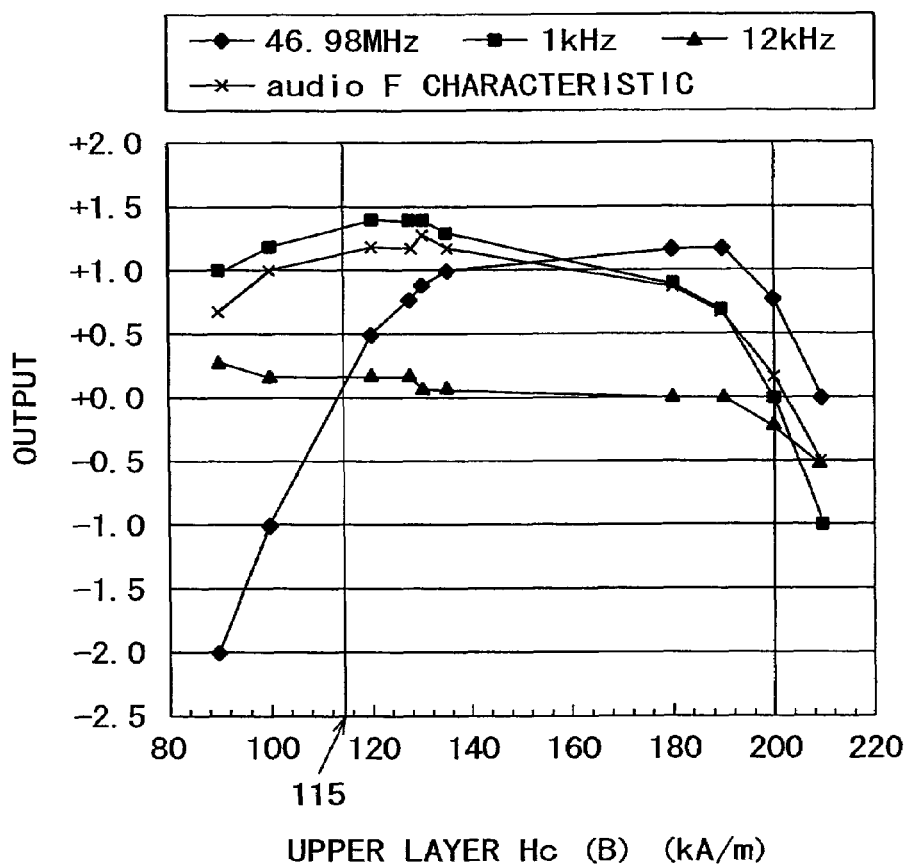
FIG. 9 is a graph showing the electromagnetic conversion characteristics in the Example of the present invention when the values other than the coercive force Hc(B) of the upper layer were fixed and the Hc(B) was changed.

FIG. 9 is a graph showing the electromagnetic conversion characteristics when, as shown in FIG. 33 (Table 19), the σs(A) and Hc(A) of the lower layer were fixed at 120 Am²/kg and 115 kA/m, respectively, the σs(B) of the upper layer was fixed at 135 Am²/kg, the thickness of the lower layer was fixed at 2.7 μm, the thickness of the upper layer was fixed at 0.3 μm, and the Hc(B) of the upper layer was changed. The results are shown also in FIG. 34 (Table 20).

As can be seen from FIG. 9 and FIG. 34 (Table 20), when the Hc(B) of the upper layer exceeded 200 kA/m, recording on the upper layer was difficult due to the upper layer having the high Hc(B), and hence the digital output was lowered. Further, when the Hc(B) of the upper layer and the Hc(A) of the lower layer satisfied the relationship: Hc(A)/Hc(B)>1.0, recording on the upper layer was inhibited due to the lower layer having the above Hc(A), and hence the digital output was markedly lowered.

As is apparent from the above, it is important that the Hc(B) of the upper layer is 100 to 200 kA/m and that the upper and lower layers satisfy the relationship: Hc(A)/Hc(B)≦1.0. When the Hc(A) and Hc(B) fall in the above range, the electromagnetic conversion characteristics of digital signals can be improved.

Figure 10:
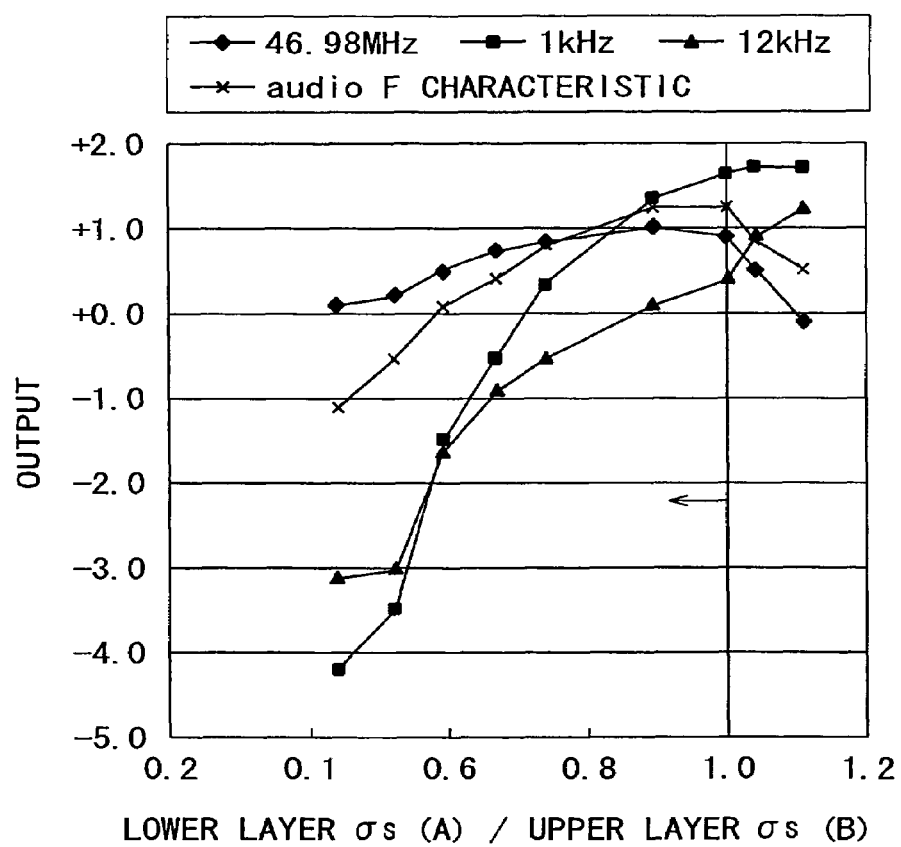
FIG. 10 is a graph showing the electromagnetic conversion characteristics in the Example of the present invention when the σs(A)/σs(B) ratio was changed.

FIG. 10 is a graph showing the electromagnetic conversion characteristics when, as shown in FIG. 35 (Table 21), the σs(B) of the upper layer was fixed at 135 Am²/kg, the Hc(A) of the lower layer was fixed at 115 kA/m, the Hc(B) of the upper layer was fixed at 135 kA/m, the thickness of the lower layer was fixed at 2.7 μm, the thickness of the upper layer was fixed at 0.3 μm, and the σs(A)/σs(B) ratio was changed. The results are shown also in FIG. 36 (Table 22).

Figure 11:
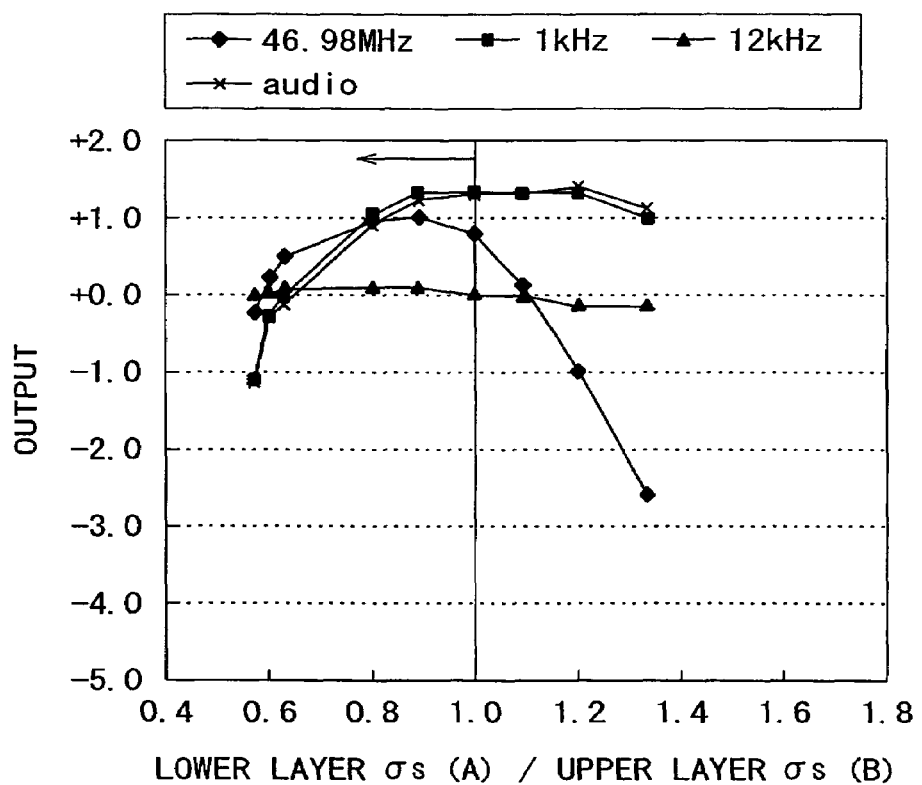
FIG. 11 is a graph showing the electromagnetic conversion characteristics in the Example of the present invention when the σs(A)/σs(B) ratio was changed.

FIG. 11 is a graph showing the electromagnetic conversion characteristics when, as shown in FIG. 37 (Table 23), the σs(A) and Hc(A) of the lower layer were fixed at 120 Am²/kg and 115 kA/m, respectively, the Hc(B) of the upper layer was fixed at 135 kA/m, the thickness of the lower layer was fixed at 2.7 μm, the thickness of the upper layer was fixed at 0.3 μm, and the σs(A)/σs(B) ratio was changed. The results are shown also in FIG. 38 (Table 24).

As can be seen from FIGS. 10 and 11, and FIGS. 36 and 38 (Tables 22 and 24), when the σs(A)/σs(B) ratio exceeded 1, the output of digital signals was lowered.

As is apparent from the above, it is important that the σs(A)/σs(B) ratio is 1 or less. When the σs(A)/σs(B) ratio falls in this range, the electromagnetic conversion characteristics of digital signals can be improved.

FIG. 12 is a graph showing the electromagnetic conversion characteristics when, as shown in FIG. 39 (Table 25), the Hc(B) of the upper layer was fixed at 135 kA/m, the σs(A) of the lower layer was fixed at 120 Am²/kg, the σs(B) of the upper layer was fixed at 135 Am²/kg, the thickness of the lower layer was fixed at 2.7 μm, the thickness of the upper layer was fixed at 0.3 μm, and the Hc(A)/Hc(B) ratio was changed. The results are shown also in FIG. 40 (Table 26).

Figure 13:
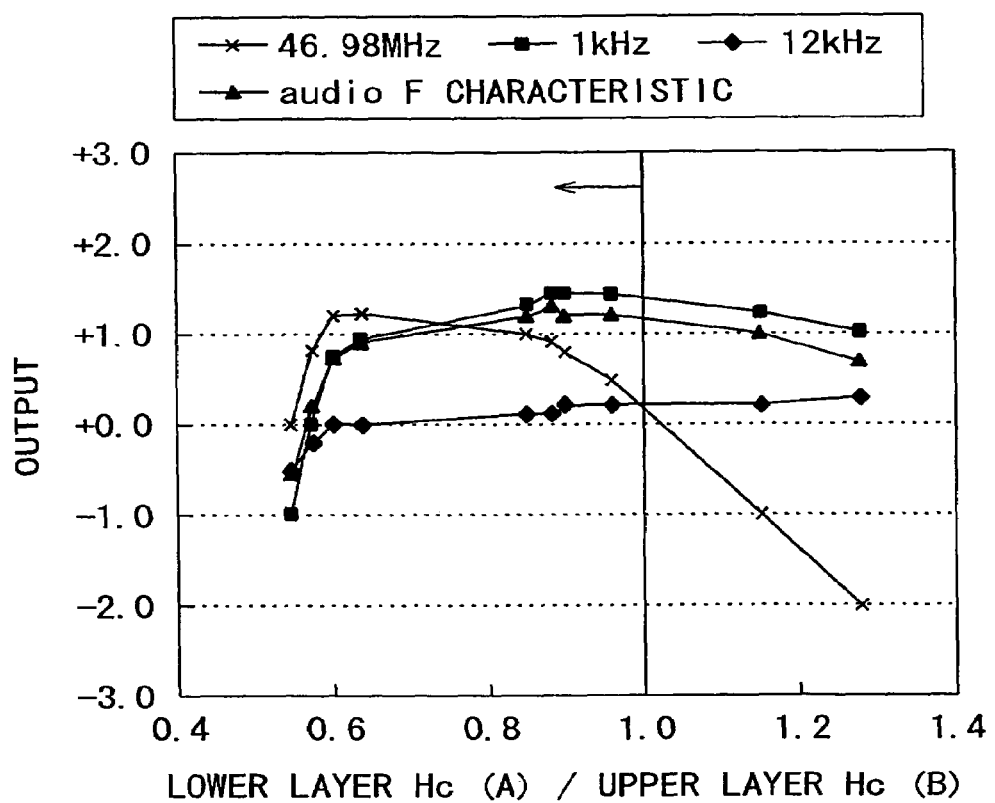
FIG. 13 is a graph showing the electromagnetic conversion characteristics in the Example of the present invention when the Hc(A)/Hc(B) ratio was changed.

FIG. 13 is a graph showing the electromagnetic conversion characteristics when, as shown in FIG. 41 (Table 27), the Hc(A) and σs(A) of the lower layer were fixed at 115 kA/m and 120 Am²/kg, respectively, the σs(B) of the upper layer was fixed at 135 Am²/kg, the thickness of the lower layer was fixed at 2.7 μm, the thickness of the upper layer was fixed at 0.3 μm, and the Hc(A)/Hc(B) ratio was changed. The results are shown also in FIG. 42 (Table 28).

As can be seen from FIGS. 12 and 13, and FIGS. 40 and 42 (Tables 26 and 28), when the Hc(A)/Hc(B) ratio exceeds 1.0, the output of analog signals especially at a frequency as low as 1 kHz is lowered. Further, it is apparent that, when the Hc(A)/Hc(B) ratio is less than 0.85, the analog audio frequency characteristic tends to be lowered.

As is apparent from the above, it is important that the Hc(A)/Hc(B) ratio is 1.0 or less, more preferably 0.85 to 0.9. When the Hc(A)/Hc(B) ratio falls in this range, the electromagnetic conversion characteristics of analog signals and digital signals can be improved.

Figure 14:
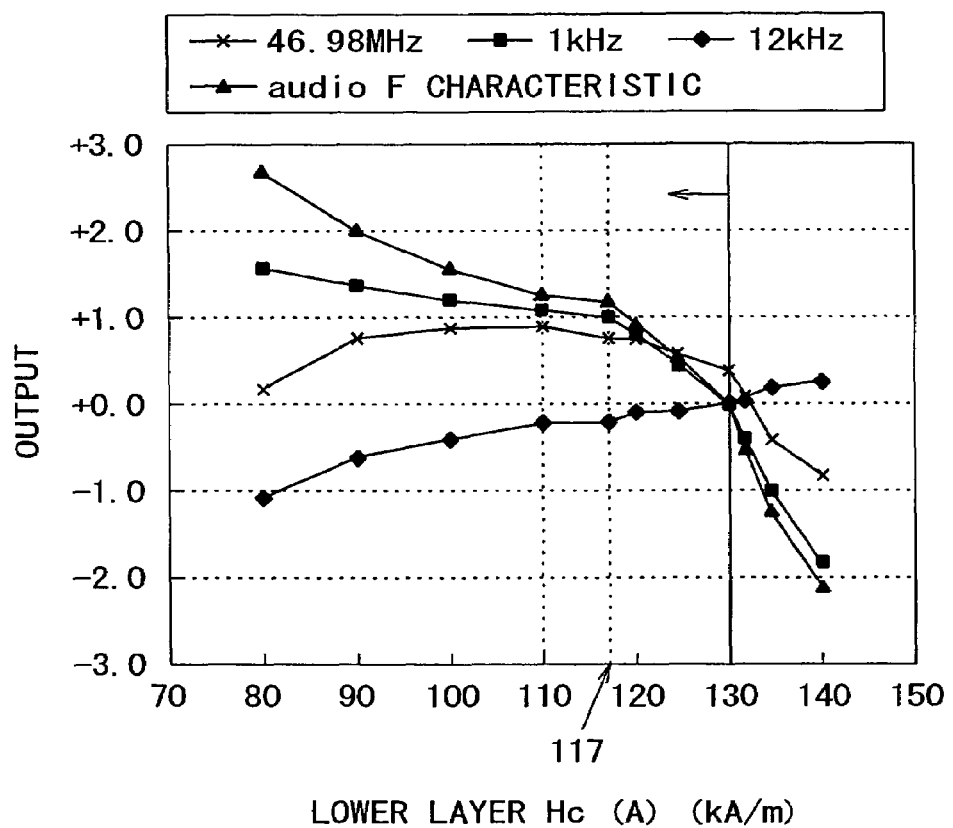
FIG. 14 is a graph showing the electromagnetic conversion characteristics in the Example of the present invention when the Hc(A)/Hc(B) ratio was changed by changing the Hc(A) while fixing the Hc(B)

FIG. 14 is a graph showing the electromagnetic conversion characteristics when, as shown in FIG. 43 (Table 29), the Hc(B) of the upper layer was fixed at 130 kA/m, the σs(A) of the lower layer was fixed at 110 Am²/kg, the σs(B) of the upper layer was fixed at 120 Am²/kg, the thickness of the lower layer was fixed at 2.5 μm, the thickness of the upper layer was fixed at 0.5 μm, and the Hc(A)/Hc(B) ratio was changed. The results are shown also in FIG. 44 (Table 30).

As can be seen from FIG. 14 and FIG. 44 (Table 30), when the Hc(A)/Hc(B) ratio is 1.0 or less, the video and analog audio properties are excellent. Especially when the Hc(A)/Hc(B) ratio is 0.85 to 1.0, more preferably 0.85 to 0.9, the balance between the video and analog audio properties is excellent.

What is claimed is:

1. A magnetic recording medium comprising a nonmagnetic support, a first magnetic layer comprised of magnetic powder (A), and a second magnetic layer comprised of magnetic powder (B), wherein said first and second magnetic layers are formed on said nonmagnetic support in this order, said magnetic powder (A) used in said first magnetic layer having the following characteristics:

a saturation magnetization ss(A) of 80 to 150 Am2/kg; and a coercive force Hc(A) of 90 to 180 kA/m, said magnetic powder (B) used in said second magnetic layer having the following characteristics:

a saturation magnetization ss(B) of 100 to 200 Am2/kg; and a coercive force Hc(B) of 100 to 200 kA/m, wherein said first and second magnetic layers satisfy the following relationships:

$$ss(A)/ss(B) \leq 1.0, \text{ and } Hc(A)/Hc(B) \leq 1.0,$$

wherein said first magnetic layer has a thickness T(A) in the range represented by the following formula:

$$1.0 \ \mu m \leq T(A) \leq 4.0 \ \mu m,$$

and wherein said second magnetic layer has a thickness T(B) in the range represented by the following formula:

$$0.01 \ \mu m \leq T(B) \leq 0.5 \ \mu m,$$

and wherein said magnetic powder (A) used in said first magnetic layer is comprised of acicular iron and has a cobalt content of 0 to 5 at. %, and said magnetic powder (B) used in said second magnetic layer is comprised of acicular iron and has a cobalt content of 5 to 50 at. % and further wherein said second magnetic layer has a thickness that is greater than 0.01 micrometer.

* * * * *